(12) United States Patent
Sugaya et al.

(10) Patent No.: US 7,828,961 B2
(45) Date of Patent: Nov. 9, 2010

(54) SLUDGE THICKENING DEVICE

(75) Inventors: Kenzou Sugaya, Kagawa (JP); Hiroichi Kawasaki, Kagawa (JP); Masayoshi Katayama, Kagawa (JP); Manabu Yamashita, Kagawa (JP); Masaharu Miyawaki, Kagawa (JP)

(73) Assignee: Ishigaki Company Limited, Tokyo (JP)

( * ) Notice: Subject to any disclaimer, the term of this patent is extended or adjusted under 35 U.S.C. 154(b) by 311 days.

(21) Appl. No.: 11/911,475

(22) PCT Filed: Jul. 20, 2005

(86) PCT No.: PCT/JP2005/013292

§ 371 (c)(1),
(2), (4) Date: Oct. 12, 2007

(87) PCT Pub. No.: WO2006/112041

PCT Pub. Date: Oct. 26, 2006

(65) Prior Publication Data

US 2009/0057235 A1 Mar. 5, 2009

(30) Foreign Application Priority Data

Apr. 14, 2005 (JP) ............................. 2005-116491

(51) Int. Cl.
*C02F 11/14* (2006.01)

(52) U.S. Cl. ..................... 210/96.1; 73/54.28; 73/61.41; 210/101; 210/143; 210/145; 210/206; 210/383; 210/392

(58) Field of Classification Search ................. 210/96.1
See application file for complete search history.

(56) References Cited

U.S. PATENT DOCUMENTS 3,292,422 A * 12/1966 Banks ........................ 73/54.39
3,777,551 A * 12/1973 Weiss ........................ 73/54.28

(Continued)

FOREIGN PATENT DOCUMENTS

CN 2913356 6/2007

(Continued)

OTHER PUBLICATIONS

Australian Office Action of patent family member Australian Patent Application No. 2005330884 (Feb. 4, 2009).

(Continued)

*Primary Examiner*—Peter A Hruskoci
(74) *Attorney, Agent, or Firm*—Greenblum & Bernstein, P.L.C.

(57) ABSTRACT

A differential rate rotary thickener; a power detector which is disposed in a sludge receiver tank for thickened sludge thickened in the differential rate rotary thickener; a discriminator which receives an electric signal for a thickened sludge concentration (X) detected by the power detector and which calculates and discriminate the data; a first controller which receives an instruction signal being a discriminated result in the discriminator and which operates an outer cylinder driving machine and a screw driving machine; a ratio setter which receives a discriminated signal of the discriminator and which increases or decreases a chemical feed rate ($\alpha$) of flocculant stepwise; and a second controller which receives an instruction signal from the ratio setter and which operates a flocculant-feeding pump are provided. Thickening of sludge is performed by controlling the chemical feed rate ($\alpha$), a rotational speed (S) of a screw, and a rotational speed (C) of an outer cylinder screen.

13 Claims, 16 Drawing Sheets

U.S. PATENT DOCUMENTS

| | | | | | |
|---|---|---|---|---|---|
| 4,041,854 | A | * | 8/1977 | Cox | 100/112 |
| 4,175,425 | A | * | 11/1979 | Brookfield | 73/54.28 |
| 4,544,489 | A | * | 10/1985 | Campbell et al. | 210/709 |
| 4,705,055 | A | * | 11/1987 | Rohm et al. | 134/57 R |
| 4,781,823 | A | * | 11/1988 | Shinozaki | 210/86 |
| 5,003,814 | A | * | 4/1991 | Crawford et al. | 137/92 |
| 5,056,358 | A | * | 10/1991 | Laskowski et al. | 73/54.28 |
| 5,382,368 | A | * | 1/1995 | Sato | 210/710 |
| 6,673,247 | B2 | * | 1/2004 | Olson | 210/710 |

FOREIGN PATENT DOCUMENTS

| | | |
|---|---|---|
| JP | 58-45886 | 10/1983 |
| JP | 1-39840 | 8/1989 |
| JP | 4-238699 | 8/1992 |
| JP | 5-305253 | 11/1993 |
| JP | 6-25747 | 4/1994 |
| JP | 7-136700 | 5/1995 |
| JP | 10-337598 | 12/1998 |
| JP | 2000-117494 | 4/2000 |
| JP | 2001-179492 | 7/2001 |
| JP | 2002-239314 | 8/2002 |
| JP | 2003-181216 | 7/2003 |
| JP | 2004-017014 | 1/2004 |
| JP | 2004-17014 | 1/2004 |
| JP | 2004-090049 | 3/2004 |
| JP | 2005-138039 | 6/2005 |
| JP | 2005-274250 | 10/2005 |
| JP | 2006-289308 | 10/2006 |
| WO | 2006/112041 | 10/2006 |

OTHER PUBLICATIONS

English language Abstract of JP 2004-017014.
English language Abstract of JP 2004-090049.
English language Abstract of JP 10-337598.
English language Abstract of JP 7-136700.
English language Abstract of JP 4-238699.
English language Abstract of JP 2002-239314.
English language Abstract of JP 2001-179492.
English language Abstract of JP 2003-181216.
English language Abstract of JP 2005-138039.
English language Abstract of JP 2005-274250.
English language Abstract of JP 2006-289308.
English language Abstract of JP 5-305253.
English language Abstract of JP 2000-117494.

* cited by examiner

RELATIONSHIP BETWEEN CHEMICAL FEED RATE
AND THICKENED SLUDGE CONCENTRATION

SLUDGE THICKENING DEVICE

TECHNICAL FIELD

The present invention relates to a sludge thickening device for and a sludge thickening method of thickening sewage mixed raw sludge, sewage digested sludge, excess activated sludge, and the like, and particularly to a sludge thickening device for and a sludge thickening method of controlling an amount of flocculant added to sewage sludge, and the rotational speeds of a screw and an outer cylinder screen of a differential rate rotary thickener which performs thickening using a filtering separation method while rotating the screw and the outer cylinder screen at different speeds from each other.

BACKGROUND ART

A screw press has been well known as an apparatus for thickening and dehydrating sludge including organic substances of poor filtration characteristics, the screw press reducing moisture content in dehydrated sludge by adding flocculent to raw slurry including the substances and forming flocs of suspended matter, and recovering filtration surface, which is easily clogged, while rotating a screw provided in an outer cylinder screen. Furthermore, a screwpress is disclosed, which is provided with a screw and an outer cylinder screen configured to rotate in opposite directions to each other, and which aims to prevent an excessive load by means of decreasing the speed of an outer cylinder screen by detecting a load with a load detecting device installed in an outer cylinder screen drive motor. (Refer to Patent Document 1).

Furthermore, a control apparatus is disclosed, in which a filtration apparatus that a screw is rotatably provided inside a filter is provided with a supply pressure detecting means, a screw torque detecting means, and a screw-rotational speed control means so that the rotational speed of the screw is controlled using a detected results of the supply pressure detection and the torque detection to thereby maintain the moisture content of a thickened sludge to be constant (refer to Patent Document 2).

As a thickener which is used for thickening raw sludge and the like, a differential rate rotary thickener is disclosed in which an outer cylinder including on the circumferential surface thereof a screen (a filter element), and a screw, which is concentrically located within the outer cylinder, rotate in the opposite direction; and sludge, which is fed into the outer cylinder being disposed substantially horizontally, is thickened using a filtering separation method and discharged while transferring the sludge in the axial direction of the outer cylinder by using the screw (refer to Patent Document 3).

As a control apparatus for a rotary thickener, a centrifugal thickener is disclosed in which a disc-shaped detecting body is submerged in thickened sludge, and a torque detecting apparatus is provided to a drive motor being connected to the detecting body so as to measure the sludge concentration, whereby an amount of feed sludge and the rotational speed of an outer cylinder bowl are adjusted (refer to Patent Document 4). Moreover, a centrifugal thickener is disclosed, in which a viscosity detector and an automatic control means are provided with which, after submerging a rotary wing in the thickened sludge, a detected concentration value detected from rotary torque of the rotary wing is outputted so that the concentration of the thickened sludge is maintained to be constant by controlling a rotation difference (refer to Patent Document 5).

Patent Document 1: Japanese Patent Application Laid-open No. Hei 4-238699 (claim 2, FIG. 1)

Patent Document 2: Japanese Patent Application Laid-open No. 2002-239314 (claim 4, FIG. 1)

Patent Document 3: Japanese Patent Application Laid-open No. 2001-179492

Patent Document 4: Japanese Utility Model Application Laid-open No. Hei 6-25747 (claim 1, FIG. 1)

Patent Document 5: Japanese Patent Publication No. Hei 1-39840 (Scope of Claim, FIG. 5)

DISCLOSURE OF THE INVENTION

A first problem is that, for sludge having favorable filtration characteristics with low viscosity, a conventional screw press prevents occurrence of an excessive load and obtains a cake having a uniform moisture content by controlling the rotational speed of a screw and, however, for sludge having poor filtration characteristics, when the volume of a filtration chamber is decreased for compressing and dehydrating the sludge, a filtration surface of an outer cylinder screen is clogged at an early stage; or, when rapidly compressing the sludge, it is leaked from the outer cylinder screen along with filtration liquid, thus, there is a possibility that the filtration liquid is suspended. Thus, there is a problem that thickening efficiency is low, and it is difficult to cause the concentration of obtained thickened sludge to be uniform.

In addition, there is a problem that, for an apparatus which detects a concentration and a feed amount of raw slurry and control the concentration of thickened sludge and a torque, since an amount of supplied sludge and a concentration thereof are constantly changed and then running torques applied to a screw and an outer cylinder screen are changed, it is difficult to cause the concentration of the thickened sludge to be uniform.

An object of the present invention is to provide a sludge thickening device and a sludge thickening method, which can cause a concentration of thickened sludge to be uniform with a high thickening efficiency.

A second problem is that, in a conventional differential rate rotary thickener, since a thickening efficiency changes depending on the ratio of the outer diameter of a screw shaft and the inner diameter of an outer cylinder screen, a high thickening efficiency is not necessarily achieved. In addition, there is a problem that, in a conventional differential rate rotary thickener, a single screw vane does not necessarily contribute to achieving a high thickening efficiency with respect to various attributes of raw slurries of sludge to be thickened, a target concentration of thickened sludge, and the like.

Another object of the present invention is to provide a differential rate rotary thickener which has a high thickening efficiency.

A third problem is that, although a conventional laser optical sludge concentration meter and a conventional microwave concentration meter are effective in measuring a raw slurry of low density with a high accuracy, they have a difficulty in measuring raw slurry with a high thickening rate as thickened sludge since a solid portion has a high density. The accuracy of the measurement depends on the shape and size of a solid portion in the sludge, and ancillary equipments for the measurement also is complicated. Furthermore, a conventional apparatus in which a disc-shaped detecting body and a rotary wing are submerged to measure a sludge concentration has drawbacks that sludge is deposited on the disc being horizontally placed, which results in an error in running torque, or an action, which causes the disc to be pressed upward from the bottom thereof, is produced due to a change in increase of flow, which results in an unstable electric signal. The rotary wing submerged in the sludge also has a drawback that there is an action which pushes back the rotary wing, causing an electric signal to be unstable.

Still another object of the present invention is to provide a sludge thickening device and a sludge thickening method, which make it possible that data dispersion of obtained sludge concentrations is reduced by using a detecting body of a concentration detector to be disposed in thickened sludge, the detecting body being formed such that it is not easily influenced by change of flow; and, Additionally, data of sludge concentration having only small data dispersion are obtained in the processes of such sludge having poor filtration characteristics, such as excess activated sludge or the like in addition to sewage mixed sludge or sewage primary sludge having comparatively favorable filtration characteristics, so that a stable control of the concentration of thickened sludge can be performed.

To achieve the above object, a first feature of the present invention is that a sludge thickening device includes: a differential rate rotary thickener, which is provided with a screw in an rotatable outer cylinder screen, filters raw slurry sludge with the outer cylinder screen, the raw slurry sludge being fed to a feed end of the outer cylinder screen, and discharge thickened sludge from a discharge end of the outer cylinder screen, while rotating the screw at a different speed; a thickened-sludge-concentration detecting section which detects a sludge concentration of the thickened sludge discharged from the differential rate rotary thickener; a flocculant-feeding section which includes a flocculant-feeding pump for feeding flocculant to the raw slurry sludge; and a control section which controls a rotational speed C of the outer cylinder screen, a rotational speed S of the screw, and an amount of the flocculent, the flocculent to be fed by the flocculant-feeding pump.

The differential rate rotary thickener includes an outer cylinder driving machine for rotating the outer cylinder screen, and a screw driving machine for rotating the screw.

The thickened-sludge-concentration detecting section includes a sludge receiver tank for storing the thickened sludge discharged from the differential rate rotary thickener, and a power detector for detecting a sludge concentration of the thickened sludge and sending an electric signal to the control section.

The control section includes: a discriminator for receiving the electric signal sent from the thickened-sludge-concentration detecting section, and for thus performing arithmetic on, and discriminating, the electric signal data; a first controller for receiving a first instruction signal sent from the discriminator, and for thus controlling rotational speeds respectively of the outer cylinder driving machine and the screw driving machine; a ratio setter for receiving the first instruction signal sent from the discriminator, and for thus increasing/decreasing chemical feed rate α of the flocculant fed to the raw slurry sludge stepwise; and a second controller for receiving a second instruction signal sent from the ratio setter, and for thus operating the flocculant-feeding pump.

In the first feature of the present invention, by controlling the chemical feed rate α of flocculent, and the rotational speeds of the screw and the outer cylinder screen rotating at different speeds from each other, the amount of chemicals of flocculent can be minimized, and thickening concentration of sludge after thickening can be maintained at a mean concentration.

The outer cylinder screen may be closed at both ends with disc-shaped flange plates; the screw may include a cylindrical center axle, on an outer surface of which a screw vane is provided; a diameter f of the cylindrical center axle may be 40% to 70% of an inner diameter F of the outer cylinder screen; an inlet opening for leading the raw slurry sludge into the outer cylinder screen from a cylindrical hollow part of the cylindrical center axle may be provided on a part of a peripheral surface of the cylindrical center axle, the part being near one end of the outer cylinder screen; and an outlet opening for discharging the thickened sludge may be provided on the flange plate placed near the other end of the outer cylinder screen.

According to the above constitution, it is possible to provide a sludge thickener in which recovering effect of a screen surface is high, and thickened sludge or the like can be discharged to the outside of the outer cylinder screen without undergoing a large discharge resistance so that thickening of a substance to be processed such as sludge can be performed at high efficiency.

A degree-of-outlet-opening adjusting mechanism, which increases/decreases an area of opening of the outlet opening, may be provided to the outer cylinder.

According to the above constitution, a retaining period of sludge in the outer cylinder screen can be adjusted.

The degree-of-outlet-opening adjusting mechanism may include a shutter plate, which is placed so as to overlap the flange plate, on which the outlet opening is formed, and which provides a rotational displacement relative to the flange plate; and increase/decrease the degree of opening of the outlet opening with the shutter depending on a position of the shutter displaced in rotation relative to the flange plate.

According to the above constitution, a retaining period of sludge in the outer cylinder screen can be adjusted.

An opening edge of the outlet opening on an outer peripheral side of the outer cylinder may be located substantially at the same position as the cylindrical peripheral surface of an outer cylinder screen, when the edge and the surface are viewed in the radial direction of the outer cylinder.

According to the above constitution, since sludge is not retained in the outer cylinder screen after operation is finished, cleaning is facilitated. Moreover, since there is little resistance on the outlet, a discharging of thickened sludge is favorable. Thus, flocculated floc is not destroyed.

The screw vane may be of one of the types of single, double, and triple.

According to the above constitution, depending on the properties of sludge, such as sewage mixed raw sludge or sewage primary sludge having comparatively favorable filtration characteristics, or excess activated sludge or the like having poor filtration characteristics; or depending on a target thickening concentration, one of a single-thread vane, a double-thread vane, a triple-thread vane can be selected for the screw vane so that thickening efficiency can be raised.

It is possible that the discriminator stores an upper limit X max of the thickened sludge concentration, a lower limit X min of the thickened sludge concentration, an upper limit of rotational speed C max of the outer cylinder screen, a lower limit of rotational speed C min of the outer cylinder screen, an upper limit S max and a lower limit S min of rotational speed of the screw, which are set in advance; and sends the first instruction signal when a thickened sludge concentration X, which is detected by the thickened-sludge-concentration detecting section, is not less than the upper limit X max of the thickened sludge concentration and not greater than the lower limit X min of the thickened sludge concentration; the first controller receives the first instruction signal sent from the discriminator; and, when the thickened sludge concentration X, which is detected by the thickened-sludge-concentration detecting section, is not less than the upper limit X max of the thickened sludge concentration, increases a rotational speed of the screw driving machine stepwise when the chemical feed rate of flocculant is not greater than a lower limit of a min chemical feed rate; and, when the thickened sludge concentration X, which is detected by the thickened-sludge-concentration detecting section, is not greater than the lower limit X min of the thickened sludge concentration, decreases the rotational speed of the screw driving machine stepwise until the thickened sludge concentration X becomes not less than the lower limit X min of the thickened sludge concentration or until a rotational speed S of the screw becomes equal to the lower limit S min of the rotational speed; the ratio setter stores the chemical feed rate $\alpha$ of flocculant, and an upper limit $\alpha$ max of the chemical feed rate of flocculant and a lower limit $\alpha$ min of the chemical feed rate of flocculant, which are respectively a maximum value and a minimum value of the chemical feed rate $\alpha$ of flocculant, and which are all set in advance; receives the first instruction signal sent from the discriminator; and when the thickened sludge concentration X, which is detected by the thickened-sludge-concentration detecting section, is not less than the upper limit X max of the thickened sludge concentration, sends a second instruction signal until the thickened sludge concentration X becomes not greater than the upper limit X max of the thickened sludge concentration or until the chemical feed rate of flocculant becomes equal to the lower limit $\alpha$ min of chemical feed rate; and when the thickened sludge concentration X, which is detected by the thickened-sludge-concentration detecting section, is not greater than the lower limit X min of the thickened sludge concentration, sends the second instruction signal when the rotational speed S of the screw is not greater than the lower limit of the rotational speed S min; and the second controller receives the second instruction signal sent from the ratio setter; and when the thickened sludge concentration X, which is detected by the thickened-sludge-concentration detecting section, is not less than the upper limit X max of the thickened sludge concentration, decreases the chemical feed rate $\alpha$ of flocculant stepwise until the thickened sludge concentration X becomes not greater than the upper limit X max of the thickened sludge concentration or until the chemical feed rate of flocculant becomes equal to the lower limit $\alpha$ min of chemical feed rate; and when the thickened sludge concentration X, which is detected by the thickened-sludge-concentration detecting section, is not greater than the lower limit X min of the thickened sludge concentration, increases the chemical feed rate $\alpha$ of flocculant stepwise when the rotational speed S of the screw is not greater than the lower limit S min of the rotational speed.

According to the above constitution, since an order of priority is determined for the two operational factors of the chemical feed rate $\alpha$ of flocculant and the rotational speed S of the screw to be thereafter varied stepwise in response to variation in a thickened sludge concentration, it is possible to provide a sludge thickener, which makes it possible that an amount of used chemicals of flocculant is minimized and high thickening efficiency and thickened sludge concentration with little variation is achieved. Moreover, since the concentration of thickened sludge is stable, a management of process operation after thickening is facilitated.

It is possible that the discriminator stores an upper limit X max of the thickened sludge concentration, a lower limit X min of the thickened sludge concentration, an upper limit C max of the rotational speed of the outer cylinder screen, a lower limit C min of the rotational speed of the outer cylinder screen, an upper limit S max and a lower limit S min of the rotational speed of the screw, which are set in advance; and sends the first instruction signal when a thickened sludge concentration X, which is detected by the thickened-sludge-concentration detecting section, is not less than the upper limit X max of the thickened sludge concentration or not greater than the lower limit X min of the thickened sludge concentration; the first controller receives the first instruction signal sent from the discriminator; and when the thickened sludge concentration X, which is detected by the thickened-sludge-concentration detecting section, is not less than the upper limit X max of the thickened sludge concentration, increases the rotational speed of the screw driving machine stepwise until the rotational speed S of the screw becomes equal to the upper limit S max of the rotational speed when the chemical feed rate of flocculant is not greater than the lower limit $\alpha$ min of chemical feed rate; and when the rotational speed S of the screw is not less than the upper limit S max of the rotational speed, decreases the rotational speed of the outer cylinder driving machine stepwise until the thickened sludge concentration X becomes not greater than the upper limit X max of the thickened sludge concentration; and when the thickened sludge concentration X, which is detected by the thickened-sludge-concentration detecting section, is not greater than the lower limit X min of the thickened sludge concentration, decreases the rotational speed of the screw driving machine stepwise until the thickened sludge concentration X becomes not less than the lower limit X min of the thickened sludge concentration or until the rotational speed S of the screw becomes equal to the lower limit S min of the rotational speed; and when the rotational speed of the screw is not greater than the lower limit of rotational speed S min, increases the rotational speed of the outer cylinder driving machine stepwise until the sludge concentration becomes not less than the lower limit X min of the thickened sludge concentration or until the rotational speed of the outer cylinder screen becomes equal to the upper limit of rotational speed C max; the ratio setter stores the chemical feed rate $\alpha$ of flocculant, and an upper limit $\alpha$ max of the chemical feed rate of flocculant and a lower limit $\alpha$ min of the chemical feed rate of flocculant, which are respectively a maximum value and a minimum value of the chemical feed rate $\alpha$ of flocculant, and which are all set in advance; and receives the first instruction signal sent from the discriminator; and when the thickened sludge concentration X, which is detected by the thickened-sludge-concentration detecting section, is not less than the upper limit X max of the thickened sludge concentration, sends the second instruction signal until the thickened sludge concentration X becomes less than the upper limit X max of the thickened sludge concentration or until the chemical feed rate of flocculant becomes equal to the lower limit $\alpha$ min of chemical feed rate; and when the thickened sludge concentration X, which is detected by the thickened-sludge-concentration detecting section, is not greater than the lower limit X min of the thickened sludge concentration, sends the second instruction signal when the rotational speed C of the outer cylinder screen is not less than the upper limit of the rotational speed C max; and the second controller receives the second instruction signal sent from the ratio setter; and when the thickened sludge concentration X, which is detected by the thickened-sludge-concentration detecting section, is not less than the upper limit X max of the thickened sludge concentration, decreases the chemical feed rate $\alpha$ of flocculant stepwise until the thickened sludge concentration X becomes not greater than the upper limit X max of the thickened sludge concentration or until the chemical feed rate of flocculant becomes equal to the lower limit $\alpha$ min of chemical feed rate;

and when the thickened sludge concentration X, which is detected by the thickened-sludge-concentration detecting section, is not greater than the lower limit X min of the thickened sludge concentration, increases the chemical feed rate α of flocculant stepwise when the rotational speed C of the outer cylinder screen is not less than the upper limit C max of the rotational speed.

According to the above constitution, since an order of priority for the three operational factors of the chemical feed rate α of flocculent, the rotational speed S of the screw, and the rotational speed C of the outer cylinder screen is determined and is varied stepwise, it is possible to provide a sludge thickener, in which an amount of used chemicals of flocculant can be minimized, and in which high thickening efficiency and thickened sludge concentration with little variation is achieved in response to variation in a thickened sludge concentration. Moreover, since the concentration of thickened sludge becomes stable, a management of process operation after thickening is facilitated.

It is possible that the discriminator stores an upper limit X max of the thickened sludge concentration, a lower limit X min of the thickened sludge concentration, an upper limit C max of the rotational speed of the outer cylinder screen, a lower limit C min of the rotational speed of the outer cylinder screen, an upper limit S max and a lower limit S min of rotational speed of the screw, which are set in advance; and sends the first instruction signal when a thickened sludge concentration X, which is detected by the thickened-sludge-concentration detecting section, is not less than the upper limit X max of the thickened sludge concentration or not greater than the lower limit X min of the thickened sludge concentration; the first controller receives the first instruction signal sent from the discriminator; and when the thickened sludge concentration X, which is detected by the thickened-sludge-concentration detecting section, is not less than the upper limit X max of the thickened sludge concentration, increases a rotational speed of the screw driving machine stepwise and simultaneously, decreases stepwise the rotational speed of the outer cylinder driving machine when the chemical feed rate of flocculant is not greater than the lower limit of chemical feed rate α min; and when the thickened sludge concentration X, which is detected by the thickened-sludge-concentration detecting section, is not greater than the lower limit X min of the thickened sludge concentration, decreases the rotational speed of the screw driving machine stepwise, and simultaneously, increases the rotational speed of the outer cylinder screen stepwise until the thickened sludge concentration X becomes not less than the lower limit X min of the thickened sludge concentration, or until a rotational speed S of the screw becomes equal to the lower limit S min of the rotational speed or until the rotational speed of the outer cylinder screen becomes equal to the upper limit C max of the rotational speed; the ratio setter stores the chemical feed rate α of flocculent, and an upper limit of the chemical feed rate α max of flocculant and a lower limit of the chemical feed rate α min of flocculant, which are respectively a maximum value and a minimum value of the chemical feed rate α of flocculent, and which are all set in advance; and receives the first instruction signal sent from the discriminator; and when the thickened sludge concentration X, which is detected by the thickened-sludge-concentration detecting section, is not less than the upper limit X max of the thickened sludge concentration, sends a second instruction signal until the thickened sludge concentration X becomes not greater than the upper limit X max of the thickened sludge concentration, or until the chemical feed rate of flocculent becomes equal to the lower limit α min of chemical feed rate; and when the thickened sludge concentration X, which is detected by the thickened-sludge-concentration detecting section, is not greater than the lower limit X min of the thickened sludge concentration, sends the second instruction signal when the rotational speed S of the screw is not greater than the lower limit of the rotational speed S min or when the rotational speed C of the outer cylinder screen is not less than the upper limit C max of the rotational speed; and the second controller receives the second instruction signal sent from the ratio setter; and when the thickened sludge concentration X, which is detected by the thickened-sludge-concentration detecting section, is not less than the upper limit X max of the thickened sludge concentration, decreases the chemical feed rate α of flocculent stepwise until the thickened sludge concentration X becomes not greater than the upper limit X max of the thickened sludge concentration or until the chemical feed rate of flocculant becomes equal to the lower limit α min of chemical feed rate; and when the thickened sludge concentration X, which is detected by the thickened-sludge-concentration detecting section, is not greater than the lower limit X min of the thickened sludge concentration, increases the chemical feed rate α of flocculant stepwise when the rotational speed S of the screw is not greater than the lower limit S min of the rotational speed.

According to the above constitution, the rotational speed of the screw S and the rotational speed of the outer cylinder screen C are simultaneously controlled when an order of priority for the three operational factors of the chemical feed rate α of flocculant, the rotational speed of the screw S, and the rotational speed of the outer cylinder screen C is determined and varied stepwise in respect with variation in a thickened sludge concentration. Therefore, it is possible to provide a sludge thickener, in which a variation in a thickened sludge can be promptly managed. Therefore, an amount of used chemicals of flocculent can be minimized, and then, high thickening efficiency and thickened sludge concentration with little variation can be achieved. Moreover, since the concentration of thickened sludge is stable, a management of process operation after thickening is facilitated.

It is possible that the discriminator stores an upper limit X max of the thickened sludge concentration, a lower limit X min of the thickened sludge concentration, an optimal rotational speed Cso of the outer cylinder screen, and an optimal rotational speed Sso of the screw, which are set in advance; and sends the first instruction signal at a time when starting to operate the differential rate rotary thickener and at a time when an amount of feed raw slurry Qs varies when a thickened sludge concentration X, which is detected by the thickened-sludge-concentration detecting section, is lower than the upper limit X max of the thickened sludge concentration and higher than the lower limit X min of the thickened sludge concentration, the optimal rotational speed Cso of the outer cylinder screen and the optimal rotational speed Sso of the screw being defined by relational expressions, which are derived by setting the rotational speeds of the screw and the outer cylinder screen depending on a fluctuating amount of feed raw slurry Qs, as follows:

Optimal rotational speed $Sso$ (rpm) of screw=Rotational factor $S1$×Process speed of raw slurry $(m^3/m^2/h)$; and Optimal rotational speed $Sso$ (rpm) of outer cylinder screen=Rotational factor $C1$×Process speed of raw slurry $(m^3/m^2/h)$;

the first controller receives the first instruction signal sent from the discriminator; and controls the screw driving machine and the outer cylinder driving machine based on the optimal rotational speeds Sso, Cso calculated from the above relational expressions at a time when starting to operate the differential rate rotary thickener and at a time when the amount of feed raw slurry Qs varies when a thickened sludge concentration X, which is detected by the thickened-sludge-concentration detecting section, is lower than the upper limit X max of the thickened sludge concentration and higher than the lower limit X min of the thickened sludge concentration.

According to the above constitution, even if an amount of feed raw slurry Qs is varied, since the screw and the outer cylinder screen are rotated at an optimal speed of rotation for thickening the amount of feed raw slurry Qs, it is possible to provide a sludge thickener in which thickening of sludge can be performed at high efficiency.

The thickened-sludge-concentration detecting section may include a cylinder-shaped detecting body with a lower end portion being opened, which is suspended down into the thickened sludge, and an upper end portion provided with an air hole and a driving motor having a rotary axle, which is connected to the cylinder-shaped detecting body, and the power detector may detect a change in an electric current value of the driving motor and output the change in the electric current value in the form of an electric signal.

According to the above constitution, even for sludge having poor filtration characteristics such as excess activated sludge or the like in addition to sewage mixed sludge or sewage primary sludge having comparatively favorable filtration characteristics, thickened sludge concentration data with little dispersion are obtained, and control is performed based on the thickened sludge concentration data with little dispersion. Therefore, a stable control of thickened sludge concentration can be performed.

It is possible that the discriminator receives successive electric signals sent from the power detector; calculates a mean current value of the successive electric signals; performs a comparison operation for the mean current value, and rates of upper and lower limits of a stable current value set in advance; decreases a rotational speed S of the screw if the mean current value becomes successively lower than the rate of the lower limit for the stable current value; and increases the rotational speed S of the screw if the mean current value becomes successively higher than the rate of the upper limit for the stable electric value.

According to the above constitution, it is possible to provide a control apparatus for the differential rate rotary thickener in which the rotational speed S of the screw is automatically adjusted depending on a change in the property of sludge, and thereby, a stable constant control of thickened sludge can be performed with a minimum addition of flocculant.

When the rotational speed S of the screw is even controlled and the mean current values have been continuously detected are still becoming higher than the rate of the upper limit of the stable current value or are still becoming lower than the rate of the lower limit of the stable current value, it is possible that the discriminator sends an instruction signal to a flocculant-feeding pump; the flocculant-feeding pump receives the instruction signal sent from the discriminator. In this case, a chemical feed rate α of flocculant to be fed to raw slurry sludge may be increased if the mean current value is lower than the rate of the lower limit of the stable current value, and the chemical feed rate α of flocculant to be fed to raw slurry sludge may be decreased if the mean current value is higher than the rate of the upper limit of the stable current value.

According to the above constitution, it is possible to provide a control apparatus for the differential rate rotary thickener in which, a chemical feed rate α of flocculant is automatically adjusted depending on a change in the property of sludge, and therefore a stable constant control of thickened sludge can be performed with a minimum addition of flocculant.

A second feature of the present invention is that a method of separating and thickening sludge for a differential rate rotary thickener for performing a filtration of sludge using an outer cylinder screen includes the steps of: rotating an outer cylinder around a central axis thereof, which is substantially horizontal, the outer cylinder being closed at both ends with disc-shaped flange plates and a surface of the outer cylinder being formed by the outer cylinder screen; rotating a screw in a direction opposite to a direction in which the outer cylinder rotates, the screw being concentrically placed in the outer cylinder; feeding raw slurry sludge as a substance to be processed into a cylindrically hollow part of a cylindrical center axle of the screw, a diameter f of the cylindrical center axle being 40% to 70% of an internal diameter F of the outer cylinder screen; leading the raw slurry sludge into the outer cylinder with an empty space left in an upper portion thereof through an inlet opening provided on a part of a surface portion of the cylindrical center axle on one end of the outer cylinder; washing liquid from above on a surface of the outer cylinder; and while continuously or intermittently performing cleaning of the outer cylinder screen, transferring sludge in the outer cylinder to the other end of the outer cylinder using a screw vane provided to an outer surface of the cylindrical center axle, and discharging the sludge through an outlet opening formed on a flange plate near the other end of the outer cylinder.

According to the second feature of the present invention, it is possible to provide a method of separating and thickening sludge for a differential rate rotary thickener, in which conveying out of sludge is favorable; reproducing effect/efficiency of a screen surface is high; and sludge thickening efficiency is high.

A retaining period of sludge in the outer cylinder may be adjusted by adjusting an opening area of the outlet opening to be increased/decreased.

According to the above constitution, it is possible to provide a method of separating and thickening sludge for a differential rate rotary thickener in which a retaining period of sludge can be adjusted.

A filling rate of sludge in the outer cylinder may be not less than 50% and not greater than 90%.

According to the above constitution, it is possible to provide a method of separating and thickening sludge for a differential rate rotary thickener, in which recovering effect of a screen surface is high.

BEST MODES FOR CARRYING OUT THE INVENTION

Figure 1:
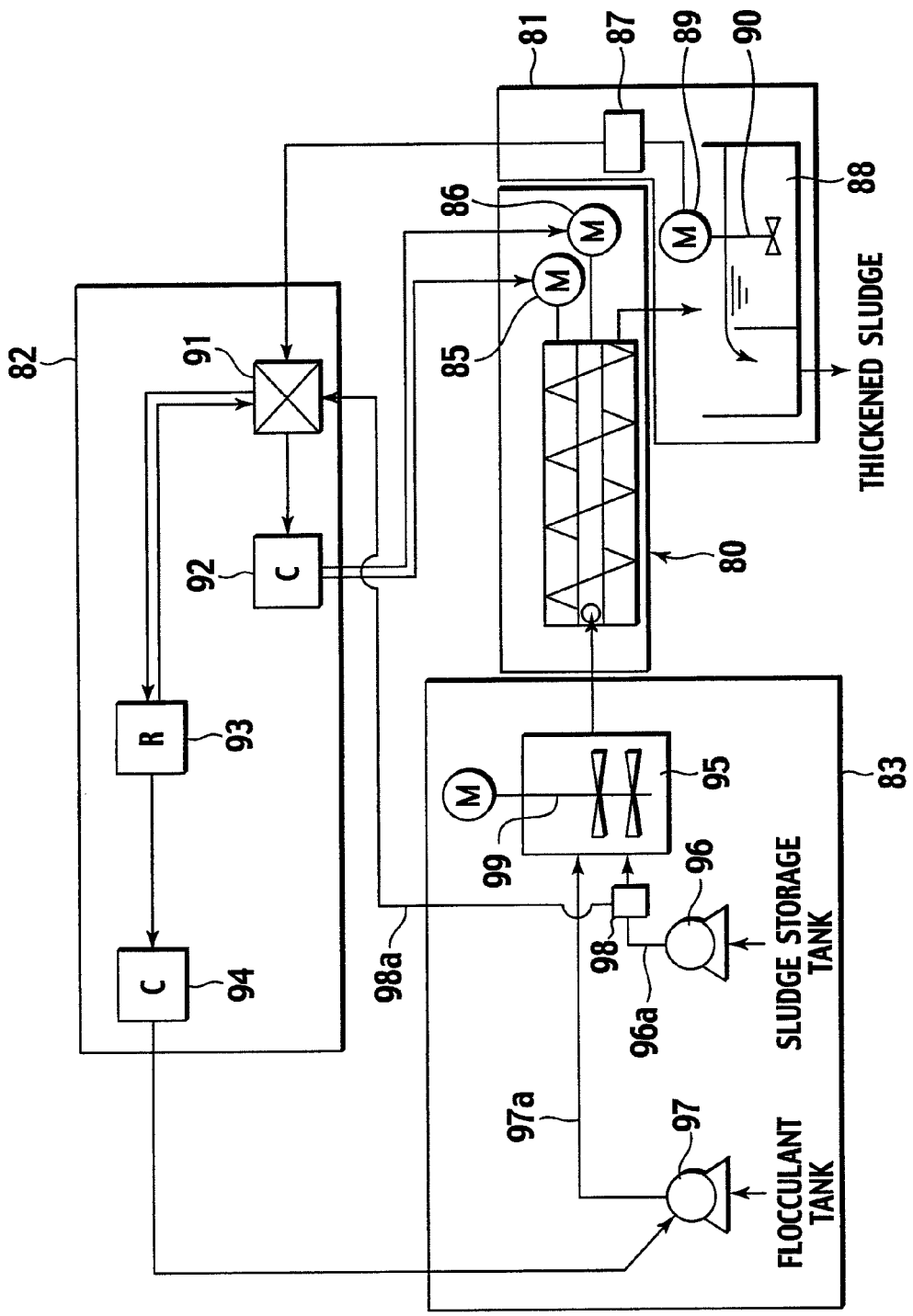
FIG. 1 is a block diagram of the entire sludge thickener system.

Embodiments of the present invention are described hereinafter with reference to accompanying drawings. Throughout the drawings, the same or similar reference numerals and symbols are given to the same or similar components. It should be, however, noted that drawings are schematic, and a relationship between a thickness and size on a plane, a ratio of thicknesses of respective layers, and the like are different from those used in practice. Accordingly, specific thicknesses and sizes should be determined in consideration of the description below. It is also to be understood that portions are included in drawings, relationships and ratios for thicknesses and sizes thereof are different from each other between the drawings.

Embodiments described hereinafter are only to illustrate an apparatus by which and a method in which a technological idea of the present invention is embodied, and not to specify materials, shapes, structures, positions, and the like, of components as follows. All change which comes within the meaning and range of equivalency of the claims are intended to be embraced therein.

First Embodiment

A sludge thickener and a sludge thickening method of a first embodiment of the present invention are described in detail with reference to drawings.

[1. A Sludge Thickener]

[Entire Constitution]

First, a constitution of the entire system of a sludge thickener is described. FIG. 1 is a block diagram of the entire sludge thickener system. A sludge thickener includes a differential rate rotary thickener 80 for thickening raw slurry sludge; a thickened-sludge-concentration detecting section 81 for detecting a thickened sludge concentration X of thickened sludge which is thickened by the differential rate rotary thickener 80 and discharged; a flocculant-feeding section 83 having a flocculant-feeding pump 97 for feeding flocculant to the raw slurry sludge; and a control section 82 for controlling the differential rate rotary thickener 80 and the flocculant-feeding pump 97 based on concentration data from the thickened-sludge-concentration detecting section 81.

[Each Constituent Element]

Next, respective constituent elements of the sludge thickener are described in detail with reference to the drawings.

[1] Differential Rate Rotary Thickener

Figure 2:
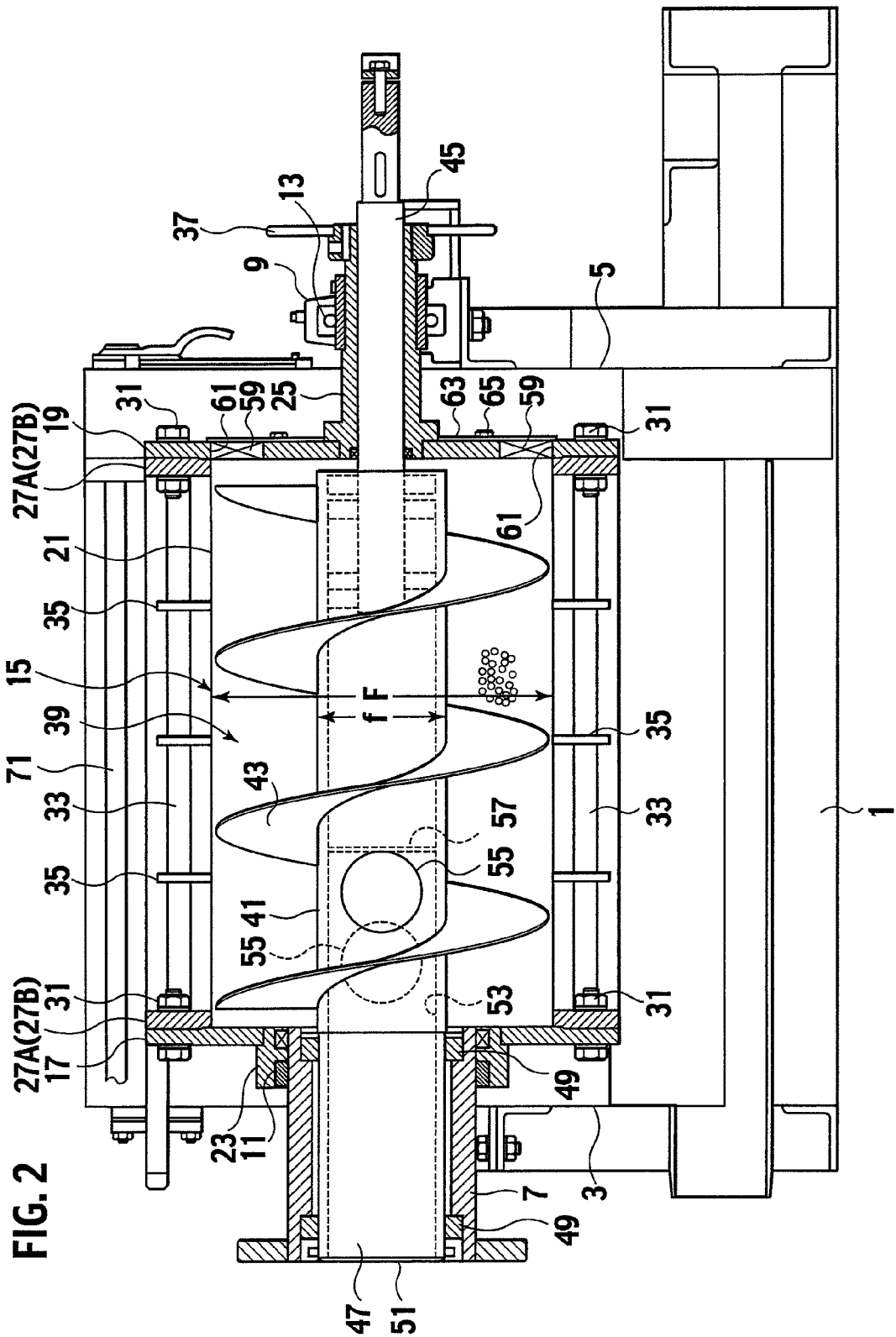
FIG. 2 is a sectional view showing an embodiment of a differential rate rotary thickener which is one of constituent parts of a sludge thickener.

First, referring to FIGS. 2 to 6, the above described differential rate rotary thickener 80 is described. FIG. 2 is a longitudinal side view of the differential rate rotary thickener 80. A rack 1 has side plates 3, 5 on the left and right sides of the rack 1 to which a bearing sleeve 7 and a bearing bracket 9 are fastened on a horizontal axis. An outer cylinder 15 is rotatably supported by the bearing sleeve 7 and the bearing bracket 9 with bearing members 11, 13.

The outer cylinder 15 is constituted such that it is closed at its both ends with disc-like flange plates 17, 19, and a cylindrical surface thereof is formed by an outer cylinder screen 21 made of perforated plate or the like. A short axle sleeve 23 is fastened to one flange plate (left side) 17, and the bearing member 11 is fastened to an inner peripheral side of the short axle sleeve 23. A long axle sleeve 25 is fastened to the other flange plate (right side) 19, and the bearing member 13 is fastened to an outer surface of the long axle sleeve 25.

Figure 3:
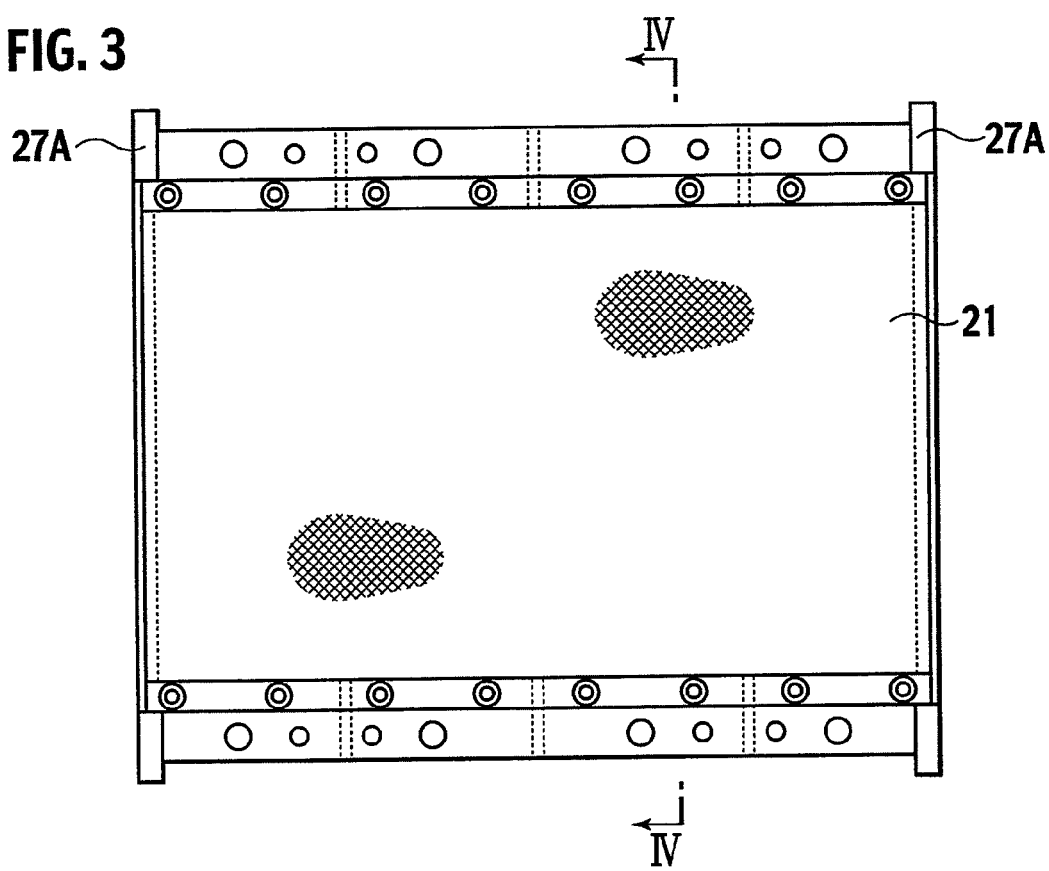
FIG. 3 is a front view of an outer cylinder screen of the differential rate rotary thickener shown in FIG. 2.
Figure 4:
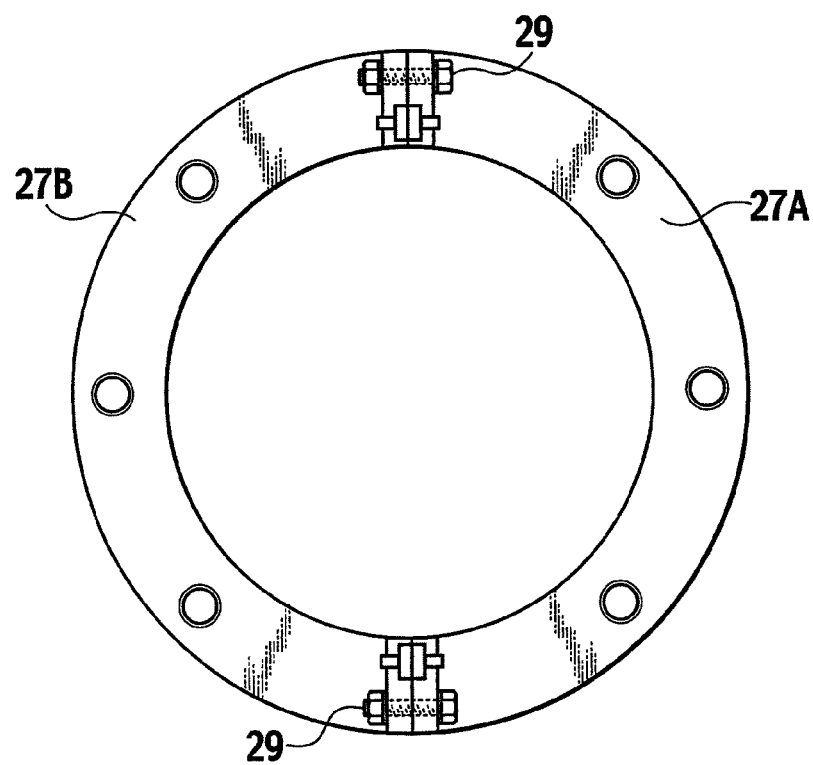
FIG. 4 is a sectional view taken along the IV-IV line in FIG. 3.

The cylindrical-shaped outer cylinder screen 21 has a shape which can be separated in two halves as shown in FIGS. 3 and 4, and is fastened at its both ends to semicircular ring members 27A and 27B which are connected to each other with bolts/nuts 29. The left and right semicircular rings 27A and 27B are fastened to the flange plates 17 and 19 with bolts/nuts 31. A plurality of tie bars 33 are bridged between the right and left semicircular ring members 27A and 27B. A plurality of supporting rings 35 are fastened on middle portions in an axial direction of the respective tie bars 33 to secondarily support the outer cylinder screen 21 on middle portions thereof from the outside.

A sprocket 37 for outer cylinder rotary drive is fastened to the long axle sleeve 25. The sprocket 37 is drivably connected to a driving machine for outer cylinder rotary driver, which is not shown in the drawings, so that the outer cylinder screen 21 is, for example, driven in a counterclockwise direction (refer to FIG. 7).

Figure 5:
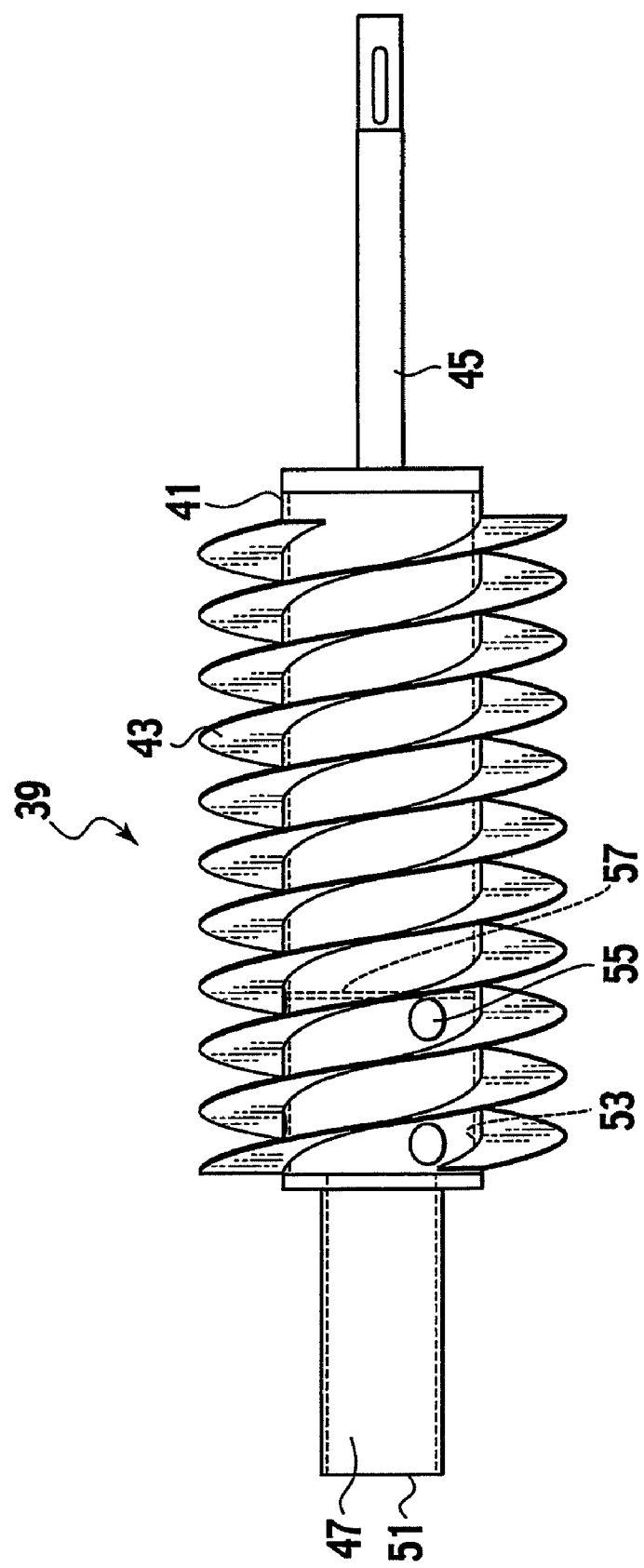
FIG. 5 is a front view of a screw in the case where a screw vane of the differential rate rotary thickener in FIG. 2 is of a triple-thread type.

In the outer cylinder screen 21, a screw 39 is concentrically disposed such that it is rotatable. The screw 39 includes a cylindrical center axle 41; a helical screw vane 43 which is provided to an outer surface of the cylindrical axle 41; and a rotary drive axle 45 which is concentrically connected to a closed end (right end) of the cylindrical center axle 41. Moreover, for the screw vane 43, for example, one of the types of single, double, and triple is selected as needed. FIG. 5 is a view showing a screw 39 with the screw vane 43 which is triple. Table 1 is a table showing relationship between the thread types of the screw vane 43, and thickening efficiency (thickening concentration, recovery rate, filtration rate). In this experimental example, thickening efficiency increases as the number of screw vanes increases.

TABLE 1

| Inner Diameter of Outer Cylinder Screen F (mm) | Diameter of Screw Axle f (mm) | Number of Screw Vanes | Concentration of Raw Slurry (%) | Thickening Concentration (%) | Recovery Rate (%) | Filtrating Rate (m3/m2/h) |
|---|---|---|---|---|---|---|
| 800 | 420 | Single | 1.5 | 4.5 | 97 | 10 |
| 800 | 420 | Single | 1.5 | 5 | 95 | 10 |
| 800 | 420 | Double | 1.5 | 5.15 | 95 | 10 |
| 800 | 420 | Triple | 1.5 | 5.1 | 97 | 10 |
| 800 | 420 | Triple | 1.5 | 5.35 | 95 | 10 |

The cylindrical center axle 41 is in the outer cylinder screen 21, and one end (left end) of the cylindrical center axle 41 is extended into the bearing sleeve 7. The above extended axle portion 47 is rotatably supported on the bearing sleeve 7 with the thickening concentration is low. Consequently, the decrease of thickening efficiency is caused. That is, when the axial ratio (f/F) for the axle diameter f of the screw 39 and the internal diameter F of the outer cylinder screen 21 is in the range of 40% to 70%, both the thickening concentration and the filtration rate are high so that the thickening efficiency can be increased.

TABLE 2

| Inner Diameter of Outer Cylinder F (mm) | Axial Diameter of Screw f (mm) | Axial ratio f/F (%) | Concentration of Raw Slurry (%) | Thickening Concentration (%) | Recovery Rate (%) | Filtration Rate (m3/m2/h) |
|---|---|---|---|---|---|---|
| 800 | 265 | 33 | 1.5 | 4.1 | 90 | 5 |
| 800 | 265 | 33 | 1.5 | 3.9 | 93 | 5 |
| 800 | 390 | 49 | 1.5 | 4.2 | 97 | 10 |
| 800 | 420 | 53 | 1.5 | 4.5 | 97 | 10 |
| 800 | 420 | 53 | 1.5 | 5.0 | 95 | 10 |
| 800 | 460 | 58 | 1.5 | 4.4 | 97 | 10 |
| 800 | 460 | 58 | 1.5 | 4.9 | 94 | 10 |
| 800 | 600 | 75 | 1.5 | 3.8 | 98 | 10 | bearing members 49. The extended axle portion 47 is open at an edge thereof, and the opening at the edge is used as a feed opening 51 for raw slurry sludge (substance to be processed).

On a surface of the cylindrical center axle 41 near one end (on the side of the flange plate 17) of the outer cylinder screen 21, two inlet openings 55 are provided into which raw slurry sludge being a substance to be processed is led through a cylindrical hollow part 53 of the cylindrical center axle 41. On the cylindrical hollow part 53 of the cylindrical center axle 41, a blind plate 57 is fastened which prevents sludge being a substance to be processed from entering into the right side, on the drawing of FIG. 2, from the position of the inlet openings 55 through the cylindrical hollow part 53.

In addition, it is preferable from the viewpoint of thickening efficiency that an outer diameter f of the cylindrical center axle 41 be 40% to 70% of an internal diameter F of the outer cylinder screen 21. A reason for the above is described below. Table 2 is a table showing the relationship between axial ratio (f/F) for the axial diameter f of the screw 39 and the internal diameter F of the outer cylinder screen 21, and thickening efficiency (thickening concentration, recovery rate, filtration rate), in the case where the screw vane 43 is of single. In this experimental example, the thickening concentration where the axial ratio is less than 40% is not low compared with that where the axial ratio is in the range of 40% to 70%. However, the filtration ratio decreases, resulting in the decrease of thickening efficiency. In addition, the filtration rate does not decrease when the axial ratio is greater than 70%. However, The rotary drive axle 45 passes through the long axle sleeve 25 in the axial direction thereof, rotatably supported thereon, and is drivably connected to a driving machine for screw rotary driver not shown in the drawings so that the screw 39 is driven, for example, in a clockwise direction.

The screw vane 43 transfers sludge in the outer cylinder 15 from the left side (on the side of the flange plate 17) to the right side (on the side of the flange plate 19), on the drawing of FIG. 2, by a clockwise rotation of the screw 39. The outer edge of the screw vane 43 faces the inner surface of the outer cylinder screen 21 with a small gap provided therebetween to prevent the sludge from taking a short path. Not that, a scraper is provided to the screw vane 43 as needed so that the outer cylinder screen 21 can be recovered by scratching.

On the flange plate 19, a plurality of outlet openings 59, are formed to be openings to discharge thickened sludge in the outer cylinder 15. Each outlet opening 59 is an arc-shaped opening, and is concentric with the center of the outer cylinder 15. Furthermore, an open edge 61 on the side of the outer surface of the outer cylinder is located almost at the same position as that of the surface (an inner surface) of the outer cylinder surface 21. This means there is no weir between the inner surface of the outer cylinder screen 21 and the outlet opening 59. Therefore, after finishing an operation, cleaning work can be easily done with no sludge remained in the outer cylinder screen 21.

Figure 6:
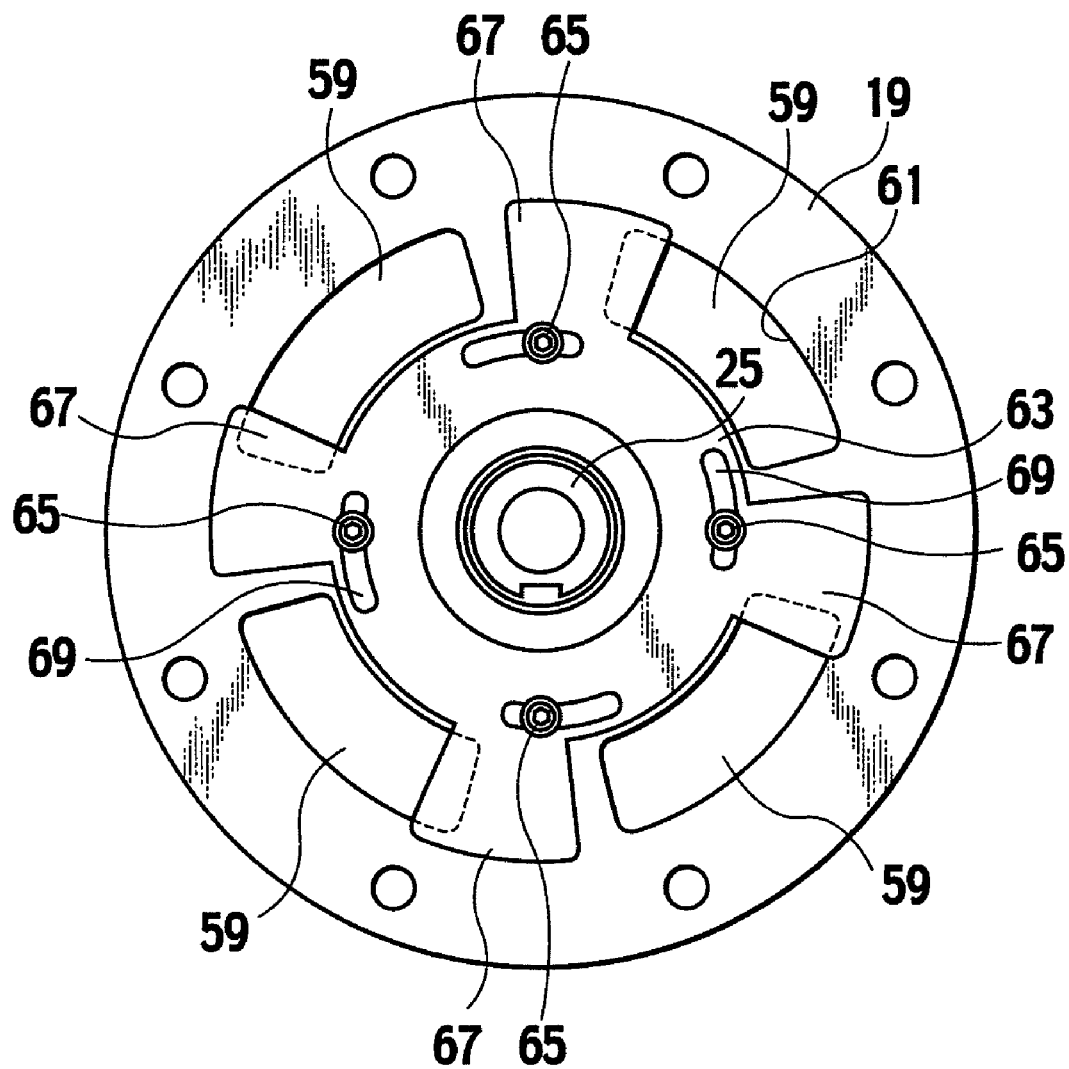
FIG. 6 is an side view showing a side of an outer cylinder of the differential rate rotary thickener in FIG. 2, on which outlet openings are disposed.

As well shown in FIG. 6, a shutter plate 63, which is placed so as to overlap an outer surface of the flange plate 19, is fastened to the flange plate 19 by bolts 65, so that it is enabled to displace in rotation, which serves as an degree-of-outlet-opening adjusting mechanism for adjusting an area of opening (effective area) of the outlet opening 59. The shutter plate 63 has a wing shaped section 67 for every outlet opening 59, and uniformly increases or decreases the degree of opening of the outlet openings 59 with the wing shaped section 67 in response to a rotary displacement position thereof (a fixed position in a rotational direction) relative to the flange 19. Note that, a through-hole 69 for a bolt 65 formed on the shutter plate 63 is a circular arc-shaped long hole, and is concentric with the outer cylinder 15. The shutter 63 is fastened with a bolt 65 to the flange plate 19 at an arbitrary angle of rotation within the range of the through-hole 69.

An wash pipe 71 for washing fluid, which is placed exterior to and over the outer cylinder screen 21, is fastened to left and right side plates 3, 5 so that it is bridged between the left and right side plates 3, 5. The wash pipe 71 is placed on a position which is slightly deviated from the position right above the outer cylinder screen 21 to the lagging side relative to the rotational direction of the outer cylinder screen 21. Thus, cleaning liquid flushed out from the wash pipe 71 is effectively splayed on the outer cylinder screen 21.

Subsequently, a method of separating and thickening sludge using the differential rate rotary thickener 80 according to the above described constitution.

The outer cylinder screen 21 is rotated in a counterclockwise direction, and the screw 39 is rotated in a clockwise direction opposite to the rotational direction of the outer cylinder screen 21. In a pre-process, for example, flocculant of high molecular polymer is added into raw slurry sludge to thereby flocculate sludge, and the flocculated sludge is successively fed into the cylindrical hollow part 53 through the inlet opening 51 of the extended axle portion 47. The sludge enters the outer cylinder 15 through the inlet opening 55 and through the cylindrical hollow part 53, and is transferred from one end (left side) of the outer cylinder 15 to the other end (right side) thereof by the screw vane 43 rotating.

In the above transferring process, liquid constituent (filtration liquid) in the sludge transmits the outer cylinder screen 21 to be separated and discharged down through the outer cylinder 15 so that the sludge is thickened. The thickened sludge is smoothly discharged to the outside of the outer cylinder 15 through the respective outlet openings 59 without changing the direction of transfer (in the axial direction) being changed.

Thus, the thickened sludge can be discharged to the outside of the outer cylinder screen 21 without undergoing a large discharge resistance so that polymer-flocculated floc is not destroyed. Moreover, the effective areas of the outlet openings of 59 are increased or decreased with the shutter plates 63 so that a retaining period of sludge in the outer cylinder 15 can be easily adjusted.

Figure 7:
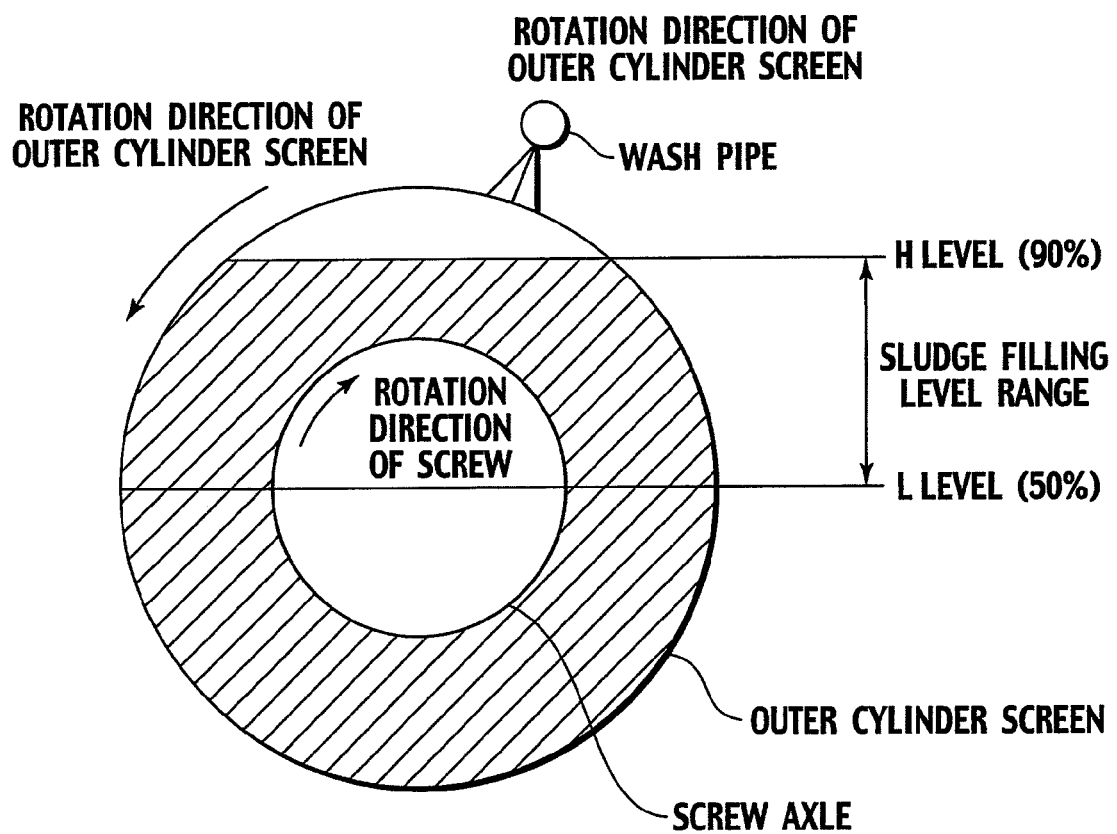
FIG. 7 is an explanatory view of a differential rate rotary thickener in operation.

In the above sludge thickening process, cleaning liquid is flushed over the outer cylinder screen 21 forming the surface of the outer cylinder 15 from the wash pipe 71 above the outside of the outer cylinder screen 21 to wash the outer cylinder screen 21. Rotation of the outer cylinder screen 21 contributes to an effective use of the whole filtration area (whole peripheral surface) of the outer cylinder screen 21, hence drastically increasing process capability. In this case, in order to favorably maintain an efficiency of the separating and thickening of the sludge, and improve the cleaning and recovering of the outer cylinder screen 21, the filling rate of sludge in the outer cylinder screen 21 may be set at not less than 50% or not greater than 90% as shown in FIG. 7.

Moreover, an effective sludge thickening operation is continuously performed by an effect of the conveying of thickened sludge achieved by the rotation of the screw 39, and an effect of the scratching of the outer cylinder screen 21 achieved due to difference in speed between the outer cylindrical filtration surface (outer cylinder screen 21) and the edge of the screw vane 43 rotating in the direction to the outer cylindrical filtration surface. A differential rate between the outer cylinder screen 21 and the screw 39 rotating in directions opposite to each other can be optimally set depending on sludge, and preferably set to not less than 4 RPM. Although washing is always continuously performed, when filtration characteristics are favorable, it may be intermittently performed. Further, when filtration characteristics are excellent, cleaning liquid may be not used.

As is clear from the above description, using the differential rate rotary thickener 80 and the method of separating and thickening sludge according to the present invention, thickening of a substance to be processed such as sludge, which is led into the outer cylinder through the inlet openings 55 of the cylindrical center axle 41, is high-efficiently performed by reverse rotation between the outer cylinder screen 21 and the screw 39; and thickened sludge or the like are discharged to the outside of the outer cylinder through the outlet openings 59 formed on the flange plate 19 located at the end in a direction (in the axial direction of the outer cylinder) in which sludge is transferred by the rotation of the screw 39.

Thus, there is no possibility that polymer-flocculated floc in sludge is destroyed; a stable thickening process can be performed; and sludge smoothly flows with hardly causing clogging.

[2] Flocculant-Feeding Section

Referring to FIG. 1, a flocculant-feeding section 83 is described.

As shown in FIG. 1, a flocculating apparatus 95 is disposed in a front stage of the differential rate rotary thickener 80; and a sludge circuit 96a of a sludge-feeding pump 96, which feeds excessive sludge from a storage tank or the like, and a chemical feed circuit 97a of a flocculant-feeding pump 97 are connected to the flocculating apparatus 95, respectively. In addition, a flowmeter 98, which detects an amount of raw slurry sludge to be fed into the differential rate rotary thickener 80, is provided between the sludge-feeding pump 96 and the flocculating apparatus 95, and is connected to the discriminator 91 with a flow circuit 98a.

Sludge and flocculant fed into the flocculating apparatus 95 from the sludge-feeding pump 96 and the flocculant-feeding pump 97, respectively, are stirred by a stirrer 99 and mixed to form flocculated floc, and the sludge is fed into the differential rate rotary thickener 80.

[3] Thickened-Sludge-Concentration Detecting Section

Figure 8:
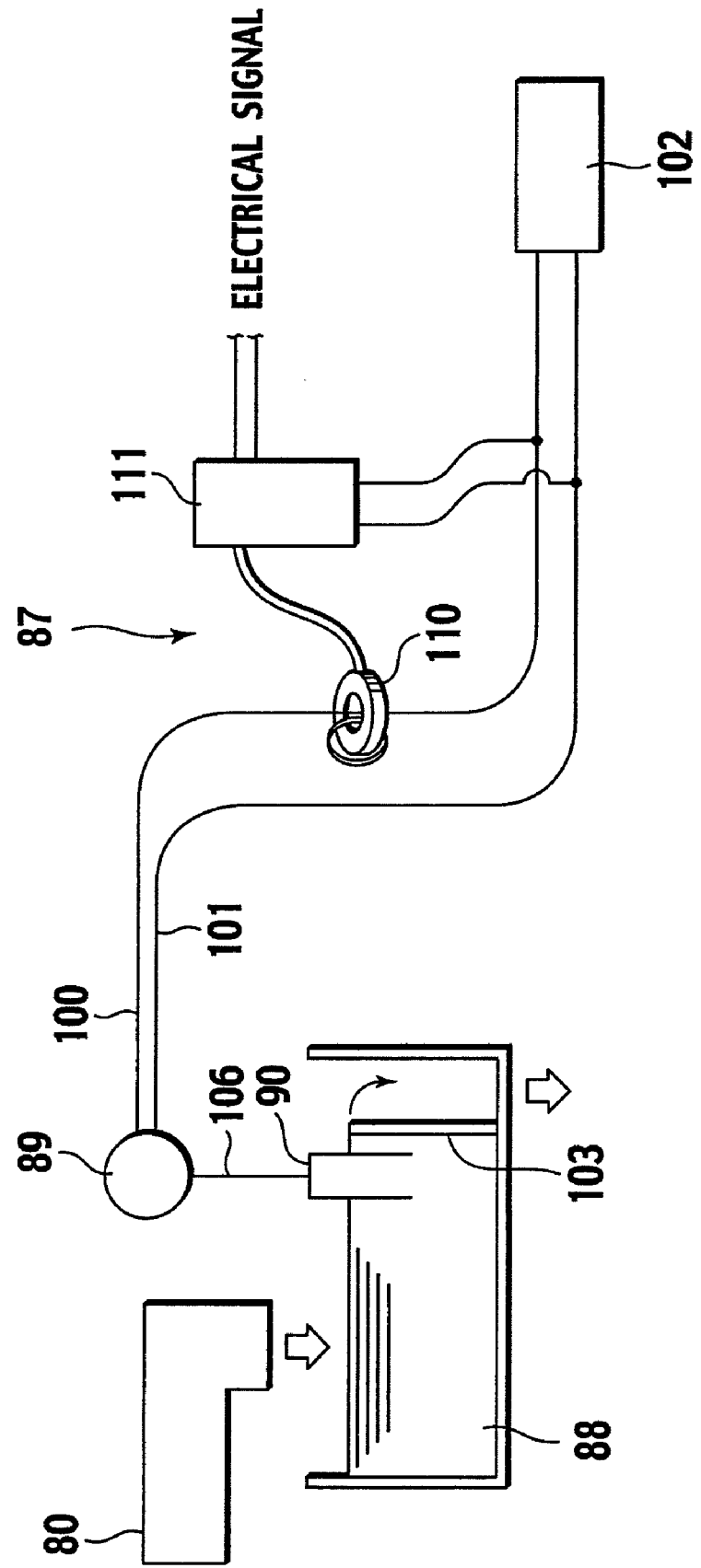
FIG. 8 is a conceptual diagram of a thickened-sludge concentration detecting section for detecting a thickened sludge concentration X of thickened sludge thickened by the differential rate rotary thickener.
Figure 9:
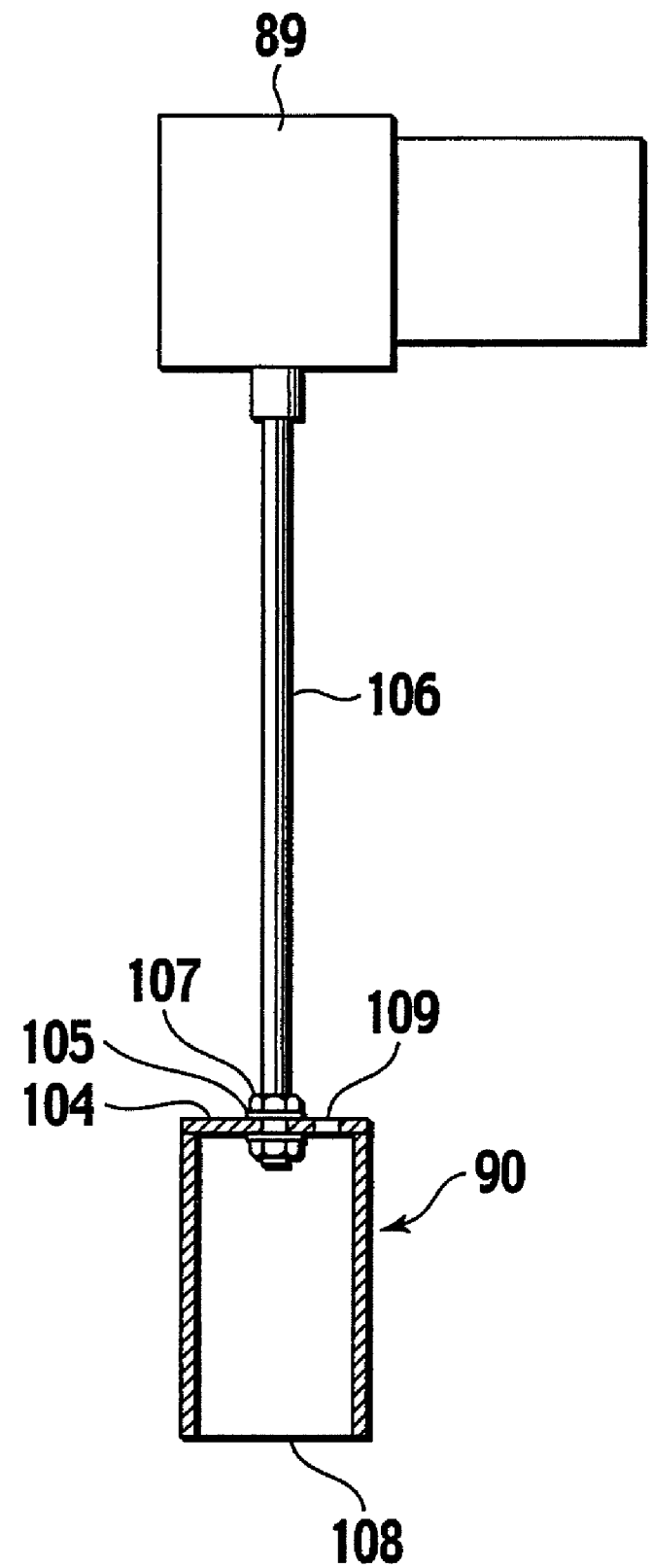
FIG. 9 is a vertical sectional view of a cylinder-shaped detecting body, which is one of constituent parts of the thickened-sludge concentration detecting section shown in FIG. 8, and which is connected to a rotary axle of a motor.

Next, referring to FIGS. 8 and 9, a thickened-sludge-concentration detecting section is described.

First, a constitution of the thickened-sludge-concentration detecting section 81 is described.

A sludge receiver tank 88 is disposed at a discharge end of the differential rate rotary thickener 80 as shown in FIG. 8, and thickened sludge, which is thickened in and discharged from the differential rate rotary thickener 80, is stored. A power detector 87 is provided with a current detector 110 and a detecting monitor 111.

A cylinder-shaped detecting body 90, which is connected to a rotary axle 106 of a driving motor 89 of an adjustable-speed motor, is suspended down into the sludge receiver tank 88. Power cables 100 and 101 in pairs are connected to the driving motor 89, and furthermore, the power detector 87 and a power source 102 of, for example, single phase 100 V are connected to the power cables 100, 101 in pairs.

The detecting body 90 is submerged in the sludge receiver tank 88 with a top portion remained above so that deposition of sludge on the top portion of the detecting body 90 is prevented. In addition, in the sludge receiver tank 88, an overflow gate 103 is provided to cause the water level of thickened sludge to be constant.

FIG. 9 is a vertical sectional view of the detecting body 90 connected to the driving motor 89. A lower end of the rotary axle 106 of the driving motor 89 is screwed into and fastened with a lock nut 107 to a fastening fitment 105 which is firmly fastened to a top plate 104 on a top end of the detecting body 90. The detecting body 90 suspended down into the sludge receiver tank 88 is open at the lower end thereof, and an opening 109 is formed on the top plate 104 of the detecting body 90.

Next, a method of detecting a thickened sludge concentration X is described.

The driving motor is started, and the cylinder-shaped detecting body 90 suspended down into the sludge receiver tank 88 is revolved on the same trajectory to cause the thickened sludge to slide over the cylindrical surface of the detecting body 90. Resistance of the thickened sludge of the detecting body 90 is transmitted to the driving motor 89 through the rotary axle 106. Fluctuation of a sliding resistance of the sludge causes a change in a force to the rotary axle 106, and then, a current value of the driving motor 89 changes. The power detector 87 detects the thickened sludge concentration X as a power value based on the changing current value from the power cable 100 on an output side. Then, the power detector 87 transmits the thickened sludge concentration X in the form of an electric signal to a control section 82. When transmitting the electric signal to be transmitted, it is, for example, in the range of 4 to 20 mA.

Since the detecting body 90 for measuring a rotational resistance is formed in a cylindrical shape and a frictional resistance on the vertical periphery is detected, there is little influence of fluctuation in flow of the thickened sludge flowing down into the sludge receiver tank 88. Therefore, data with little dispersion are obtained. Moreover, since air inside the detecting body 90 is discharged through the air hole 109 on the top plate 104, the detecting body 90 is prevented from being pushed upward due to the increasing fluctuation in the flow, then the electric signal does not become unstable. Since the top portion of the detecting body 90 is remained above the surface of the sludge, sludge does not deposit on the top of the detecting body 90, resulting in no error occurs in the running torque.

[4] Control Section

Next, referring to FIG. 1, the control section 82 is described.

As shown in FIG. 1, the control section 82 includes the discriminator 91, which receives an electric signal of the thickened sludge concentration X detected by the power detector 87, and which calculates the signal data to be thereafter discriminated; a first controller 92, which receives an instruction signal on a discriminated result of the discriminator 91, and which operates a rotational speed S of the screw 39 and a rotational speed C of the outer cylinder screen 21; a ratio setter 93, which receives a signal discriminated by the discriminator 91 and transmitted therefrom, and which increase/decrease a chemical feed rate α of flocculant; and a second controller 94, which receives an instruction signal from the ratio setter 93 to thereafter operate the flocculant-feeding pump 97.

In the discriminator 91, the following conditions are set and stored in advance, such as:

1. An upper limit X max of the thickened sludge concentration % and a lower limit X min of the thickened sludge concentration %;

2. A lower limit S min of the rotational speed and an upper limit S max of the rotational speed of the screw 39 to stop increase or decrease of the rotational speed S of the screw 39, and an increment/decrement rotational speed a (a=1 to 2 $min^{-1}$) for once to increase/decrease the rotational speed S of the screw 39 stepwise;

3. A lower limit C min of the rotational speed and an upper limit C max of the rotational speed of the outer cylinder screen 21 to stop increase or decrease of the rotational speed C of the outer cylinder screen 21; an increment/decrement rotational speed b (b=1 to 2 $min^{-1}$) for once to increase/decrease the rotational speed C of the outer cylinder screen 21 stepwise; and 4. Optimal rotational speeds Sso and Cso of the screw 39 and the outer cylinder screen 21, respectively, which achieve the highest thickening efficiency with respect to the thickening sludge concentration X and an amount of the feed raw slurry Qs.

In addition, the discriminator 91 is set in advance,

5. To transmit the data to the ratio setter 93 from the discriminator 91, depending on the thickened sludge concentration X.

Note that, the discriminator 91 may be set:

6. To decrease the rotational speed C of the outer cylinder screen 21 stepwise, and send a warning signal out when it becomes equal to the lower limit C min of the rotational speed; or to detect an abnormality in the thickened sludge concentration X by setting abnormally high and low values for thickened sludge concentration, and then send a warning signal out.

In the ratio setter 93, the following conditions are set and stored in advance:

1. An increment/decrement chemical feed rate d % (d=0.01 to 0.03%) for one time to be increased/decreased stepwise; and 2. A lower limit α min of chemical feed rate % and an upper limit α max of chemical feed rate % to stop increase or decrease of an addition of flocculation.

Additionally, the ratio setter 93 is set 3. to send to the discriminator 91 from the ratio setter 93 a signal of information that the chemical feed rate α of flocculant has reached the lower limit α min of chemical feed rate %, while retaining the lower limit α min of chemical feed rate %, when the chemical feed rate α becomes equal to the lower limit α min of chemical feed rate %.

Note that, the ratio setter 93 may be set 4. to increase the chemical feed rate α of flocculant stepwise and to send a warning signal out, while maintaining the state of the chemical feed rate α of flocculent being the upper limit α max of chemical feed rate %, when it becomes equal to the upper limit α max of chemical feed rate %.

[2. A Sludge Thickening Method in a Sludge Thickener]

[1] About operational factors set in the sludge thickening method In the sludge thickening method according to the present invention, the chemical feed rate α of flocculent, the rotational speed S of the screw 39, and the rotational speed C of the outer cylinder screen 21 were set as operational factors in sludge thickening. First, relationships between the respective operational factors, thickened sludge concentration X %, and SS recovery rate (%) of sludge are described.

Figure 13:
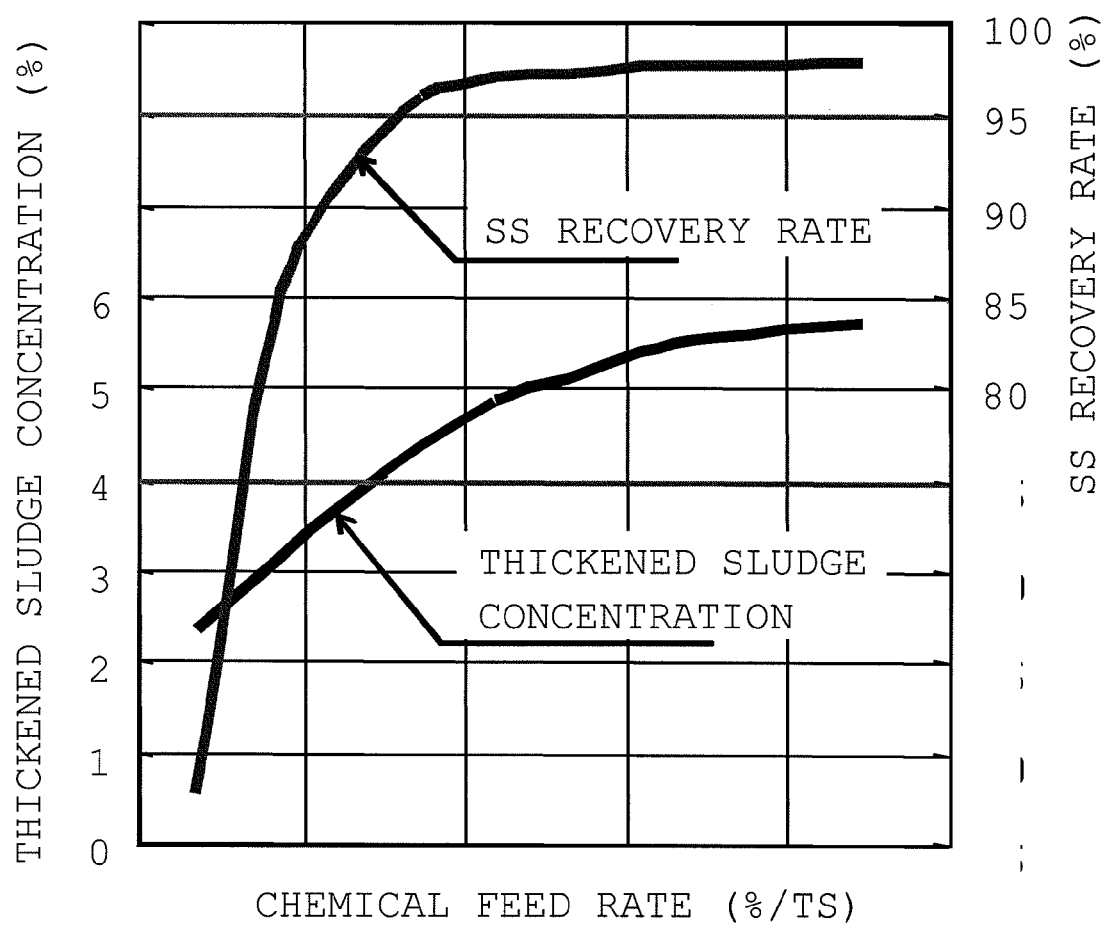
FIG. 13 is a graph showing the influence of chemical feed rate on thickened sludge concentrations and recovery rates.

1. Chemical feed rate α: Influence of the chemical feed rate α of flocculant on thickened sludge concentration X % and SS recovery rate (%) of sludge was examined. In FIG. 13, chemical feed rate α (% TS) are shown on the horizontal axis, and thickened sludge concentration X % and SS recovery rate (%) of sludge are shown on the vertical axis. As chemical feed rate α increases, both thickened sludge concentration X % and SS recovery rate (%) of sludge increase. However, when chemical feed rate α is too high, a reverse effect may be occurred.

Figure 14:
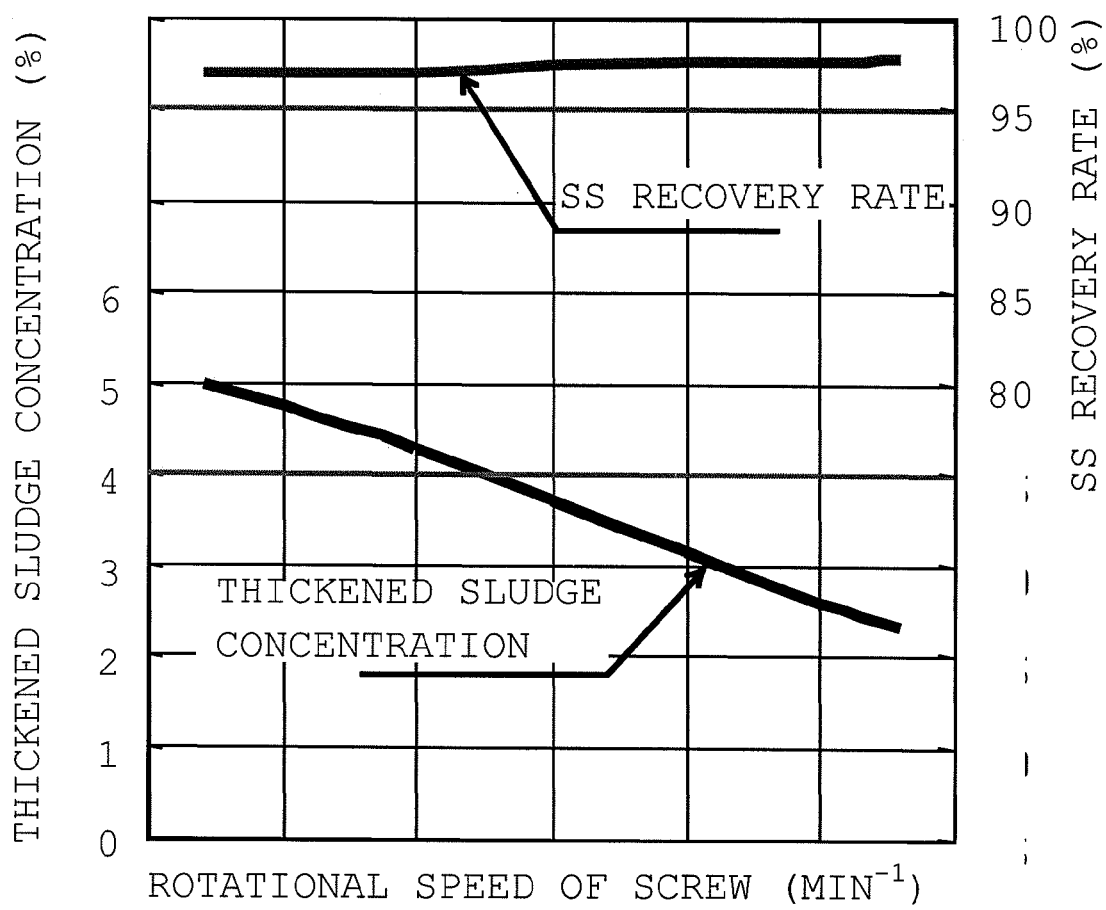
FIG. 14 is a graph showing the influence of rotational speed of screw on thickened sludge concentrations and recovery rates.

2. Rotational speed S of the screw 39: Influence of the rotational speed S of the screw 39 on thickened sludge concentration X % and SS recovery rate (%) of sludge was examined. In FIG. 14, rotational speed S ($min^{-1}$) of the screw 39 is shown on the horizontal axis, and thickened sludge concentration X % and SS recovery rate (%) of sludge are shown on the vertical axis. When rotational speed S of the screw 39 increases, thickened sludge concentration X % decreases. There is little influence on the recovery rate.

Figure 15:
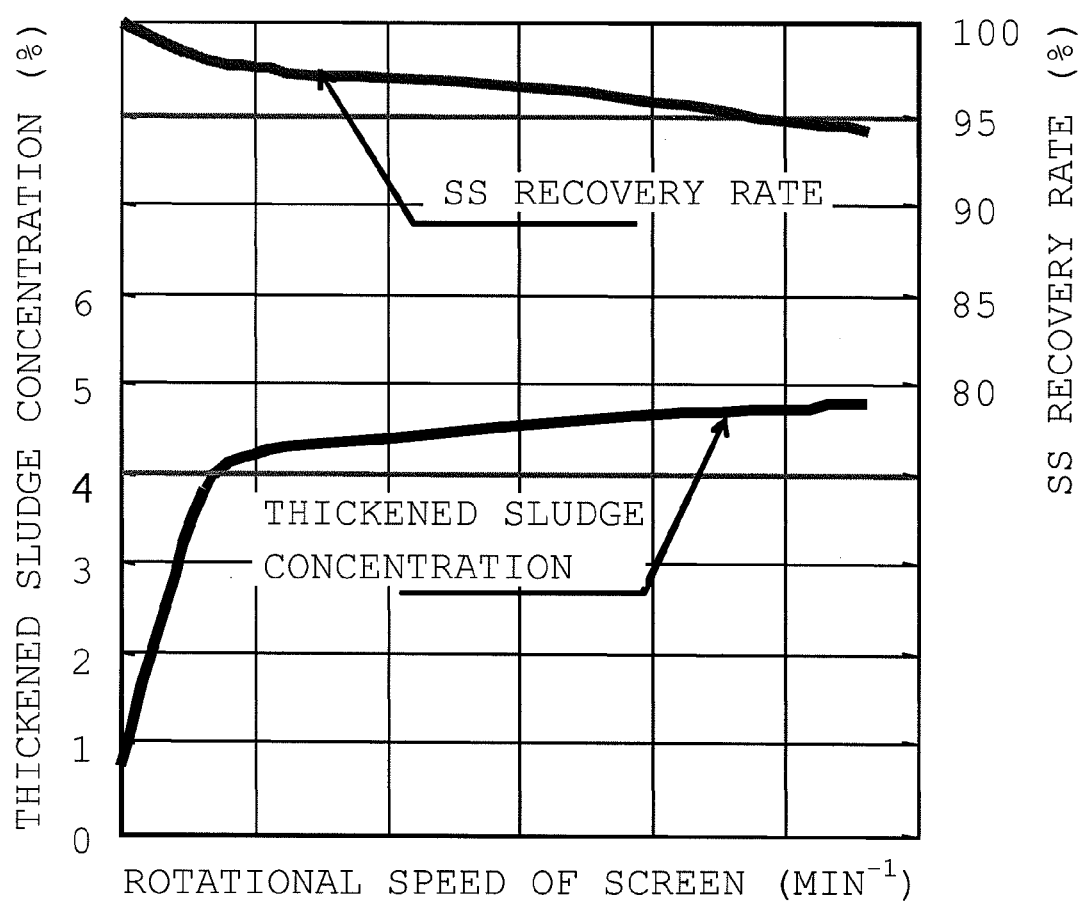
FIG. 15 is a graph showing the influence of rotational speed of an outer cylinder screen on thickened sludge concentrations and recovery rates.

3. Rotational speed C of the outer cylinder screen 21: Influence of the rotational speed C of the outer cylinder screen 21 on thickened sludge concentration X and SS recovery rate (%) of sludge was examined. In FIG. 15, rotational speed C ($min^{-1}$) of the outer cylinder screen 21 is shown on the horizontal axis, and thickened sludge concentration X % and SS recovery rate (%) of sludge are shown on the vertical axis. When the rotational speed C of the outer cylinder screen 21 is not less than a certain value, there is tendency that thickened sludge concentration X slowly increases, while SS recovery rate (%) of sludge decreases by increasing rotational speed C of the outer cylinder screen 21.

described in the following based on the relationship between the respective operational factors and the thickened sludge concentration X.

1. By following the order of priority shown in Table 3, the respective operational factors for the chemical feed rate α % of flocculant, the rotational speed S of the screw 39, and the rotational speed C of the outer cylinder screen 21 are controlled in sequence.

2. Even when the respective factors become limit values within setting ranges, if the thickened sludge concentration X does not fall within a setting range, an operational factor to be operated is changed according to the order of priority.

3. By narrowing the setting range of the rotational speed C of the outer cylinder screen 21, so that the rotational speed C of the outer cylinder screen 21 may be put out of the control targets, whereby only the chemical feed rate α and the rotational speed S of the screw 39 maybe to be as control targets.

4. To increase response rate of the thickened sludge concentration X, the rotational speed S of the screw 39 and the rotational speed C of the outer cylinder screen 21 may be simultaneously increased/decreased according to a predetermined method.

5. When increasing/decreasing the rotational speed S of the screw 39 and the rotational speed C of the outer cylinder screen 21, simultaneously, a summation of the rotational speed S of the screw 39 and the rotational speed C of the outer cylinder screen 21 may be maintained to be constant.

6. While the setting range of the thickened sludge concentration X and the setting ranges of the respective operational factors are retained as standard values, settings are reevaluated for target sludge of respective disposal stations.

TABLE 3

| OPERATIONAL FACTORS | X > X max | ORDER OF PRIORITY | X < X min | ORDER OF PRIORITY | START CONTROLLING WHEN VARIED ABOVE SETTING RANGE |
|---|---|---|---|---|---|
| CHEMICAL FEED RATE | ↘ | 1 | ↗ | 3 | STEPWISE CONTROL WITHIN SETTING RANGE |
| SCREW | ↗ | 2 | ↘ | 1 | STEPWISE CONTROL WITHIN SETTING RANGE |
| SCREEN | ↘ | 3 | ↗ | 2 | STEPWISE CONTROL WITHIN SETTING RANGE |

Note that, the thickened sludge concentration X % may be one detected by the thickened sludge concentration detector 81, or may be one calculated by the following method.

The thickened sludge concentration X of thickened sludge can be approximately calculated with, $$X=(Qs \times Ts)/(Qs+Qp+Qw-Qf)$$

where Ts=concentration of raw slurry sludge, Qs=amount of feed raw slurry, Qp=amount of feed flocculant, Qf=amount of separate liquid, Qc=amount of thickened sludge, Qw=amount of cleaning liquid.

In this case, the control section 92 is set to calculate thickened sludge concentration X using the values of Ts, Qs, Qp, Qf, Qc, and Qw.

[2] Method of Thickening Sludge

Next, a method of thickening sludge is briefly described.

(1) When thickened sludge concentration X varies beyond setting range (a lower limit, an upper limit), the method is (2) A method may be adopted of thickening sludge using optimal rotational speeds Sso and Cso of the screw 39 and the outer cylinder screen 21, respectively, which are set in advance, when the thickened sludge concentration X is within a setting range (a lower limit, an upper limit) or when operation of a sludge thickener is started, the optimal rotational speeds Sso and Cso corresponding to the thickened sludge concentration X and an amount of feed raw slurry Qs.

Furthermore, the sludge thickening method is described in detail.

First, a certain amount of raw slurry in which flocculant of a chemical feed rate α is added is fed into the differential rate rotary thickener 80, and filtered liquid is separated and thickened sludge of a thickened sludge concentration X is discharged, while rotating the outer cylinder screen 21 and the screw 39 in directions opposite to each other at rotational speeds C, S, respectively. A sludge thickener is started to be controlled so that the thickened sludge concentration X based on the property of raw slurry sludge and the fluctuation in an amount of feed raw slurry sludge, falls into the range of a lower limit X min of the thickened sludge concentration % and an upper limit X max of the thickened sludge concentration % including the lower limit X min % and the upper limit X max %. The thickened sludge concentration X is detected for every predetermined period of time (for example, 5 min.) as power using the power detector 87, and the power value thus detected is thus sent in the form of an electric signal to the discriminator 91. The discriminator 91 calculates the thickened sludge concentration X using the electric signal sent from the power detector 87, and performs a comparison operation with the lower limit X min of the thickened sludge concentration % and the upper limit X max of the thickened sludge concentration %. As a result of the comparison operation, sludge thickening is performed according to one of [1] below when X>X max or [2] below when X<X min. When X min≦X≦X max, the present condition is retained or sludge is thickened according to the method of [3] below. In addition, a sludge thickening method at a time when an operation is started, with the thickened sludge concentration X not being detected, is described in [4] below.

[1] When the thickened sludge concentration X is increased above an upper limit X max of the thickened sludge concentration %;

[2] When the thickened sludge concentration X is decreased below a lower limit X min of the thickened sludge concentration %; and

[3] When the thickened sludge concentration X is not less than a lower limit X min of the thickened sludge concentration % and not greater than an upper limit X max of the thickened sludge concentration %.

[4] At a time when the operation of a sludge thickener is started.

[1] When the thickened sludge concentration X is increased above an upper limit X max of the thickened sludge concentration %

Figure 10:
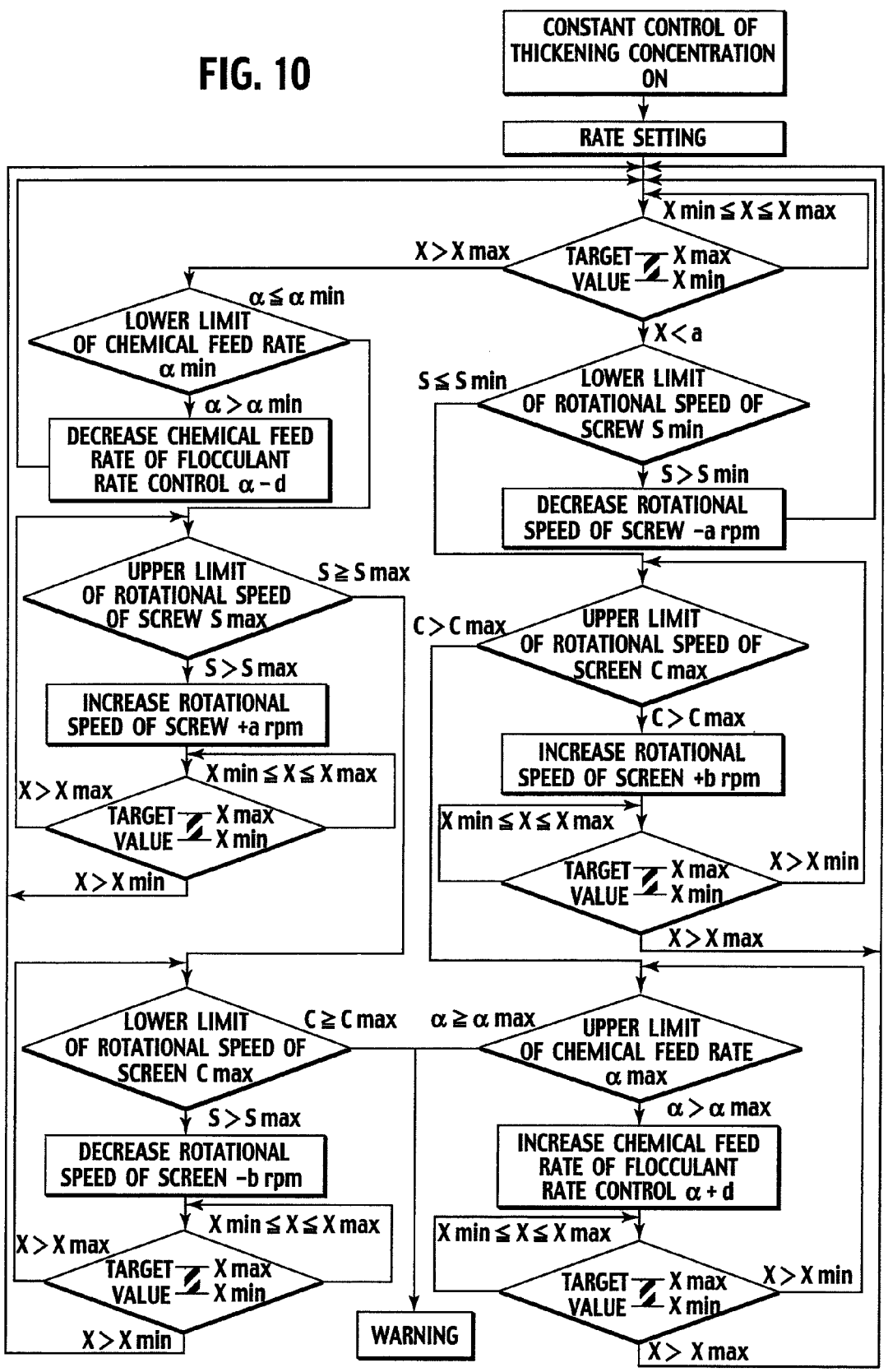
FIG. 10 is a flowchart showing a control method of a sludge thickener when a thickened sludge concentration X is out of a setting range.

FIG. 10 is a flowchart showing a method of maintaining a thickened sludge concentration X of a sledge thickener to be constant. Referring to FIG. 10, a procedure of (a) to (j) is described.

(a) When the thickened sludge concentration X is increased above an upper limit X max of the thickened sludge concentration %, an instruction signal is sent from the discriminator 91 to the ratio setter 93, and consequently an instruction signal for decreasing the chemical feed rate α of flocculant is sent from the ratio setter 93 to the second controller 94.

(b) The second controller 94 controls the flocculant feed pump 97 to thereby decrease the chemical feed rate α of flocculent by a chemical feed rate d % (d=0.01 to 0.03%).

(c) When the thickened sludge concentration X after a predetermined period of time (for example, 5 min.) is still higher than the upper limit X max of the thickened sludge concentration %, the operation is repeatedly performed until the thickened sludge concentration X becomes not greater than the upper limit X max of the thickened sludge concentration % to decrease the chemical feed rate α of flocculant stepwise.

(d) When the chemical feed rate α of flocculant becomes a lower limit α min of chemical feed rate %, information that the chemical feed rate α of flocculant has become equal to the lower limit α min of chemical feed rate % is sent back from the ratio setter 93 to the discriminator 91, while retaining the lower limit α min of chemical feed rate %.

(e) Based on the information from the ratio setter 93 that the chemical feed rate α of flocculant has become equal to the lower limit α min of chemical feed rate %, when the thickened sludge concentration X is higher than the upper limit X max of the thickened sludge concentration %, an instruction signal for increasing the rotational speed S of the screw 39 is sent from the discriminator 91 to the first controller 92.

(f) The first controller 92 operates a screw driving machine 85 to thereby increase the rotational speed S of the screw 39 by an increment/decrement rotational speed a (a=1 to 2 min$^{-1}$).

(g) When the thickened sludge concentration X after a predetermined period of time (for example, 5 min.) is still higher than the upper limit X max of the thickened sludge concentration %, an instruction signal based on the information that is sent from the discriminator 91 to the first controller 92, and this operation is repeatedly performed until the thickened sludge concentration X becomes less than or equal to the upper limit X max of the thickened sludge concentration % to thereby increase the rotational speed S of the screw 39 stepwise.

(h) When the rotational speed S of the screw 39 has become equal to an upper limit S max of the rotational speed, if the thickened sludge concentration X is higher than the upper limit X max of the thickened sludge concentration %, an instruction signal for decreasing the rotational speed C of the outer cylinder screen 21 is sent from the discriminator 91 to the first controller 92, while retaining the upper limit S max of the rotational speed.

(i) The first controller 92 operates an outer cylinder driving machine 86 to thereby decrease the rotational speed C of the outer cylinder screen 21 by an increment/decrement rotational speed b (b=1 to 2 min$^{-1}$). This operation is repeatedly performed until the thickened sludge concentration X becomes not greater than the upper limit X max of the thickened sludge concentration %, or until the rotational speed C of the outer cylinder screen 21 is decreased to the lower limit C min of the rotational speed.

(j) When the rotational speed C of the outer cylinder screen 21 is decreased to the lower limit C min of the rotational speed, an abnormality warning is sent out and a program is modified, while retaining a state in the lower limit C min of the rotational speed.

According to the above method in response to the fluctuation of the thickened sludge concentration X, an order of priority is determined for the three operational factors of the chemical feed rate, the rotational speed S of the screw 39, and the rotational speed C of the outer cylinder screen 21, and these factors are thereafter varied stepwise, whereby the thickened sludge concentration X can be maintained to be constant, and an amount of chemicals can be decreased depending on the variation of sludge property. Furthermore, since the sludge concentration of thickened sludge becomes stable, a management of process operation after thickening is facilitated.

First Modified Example of First Embodiment

Figure 11:
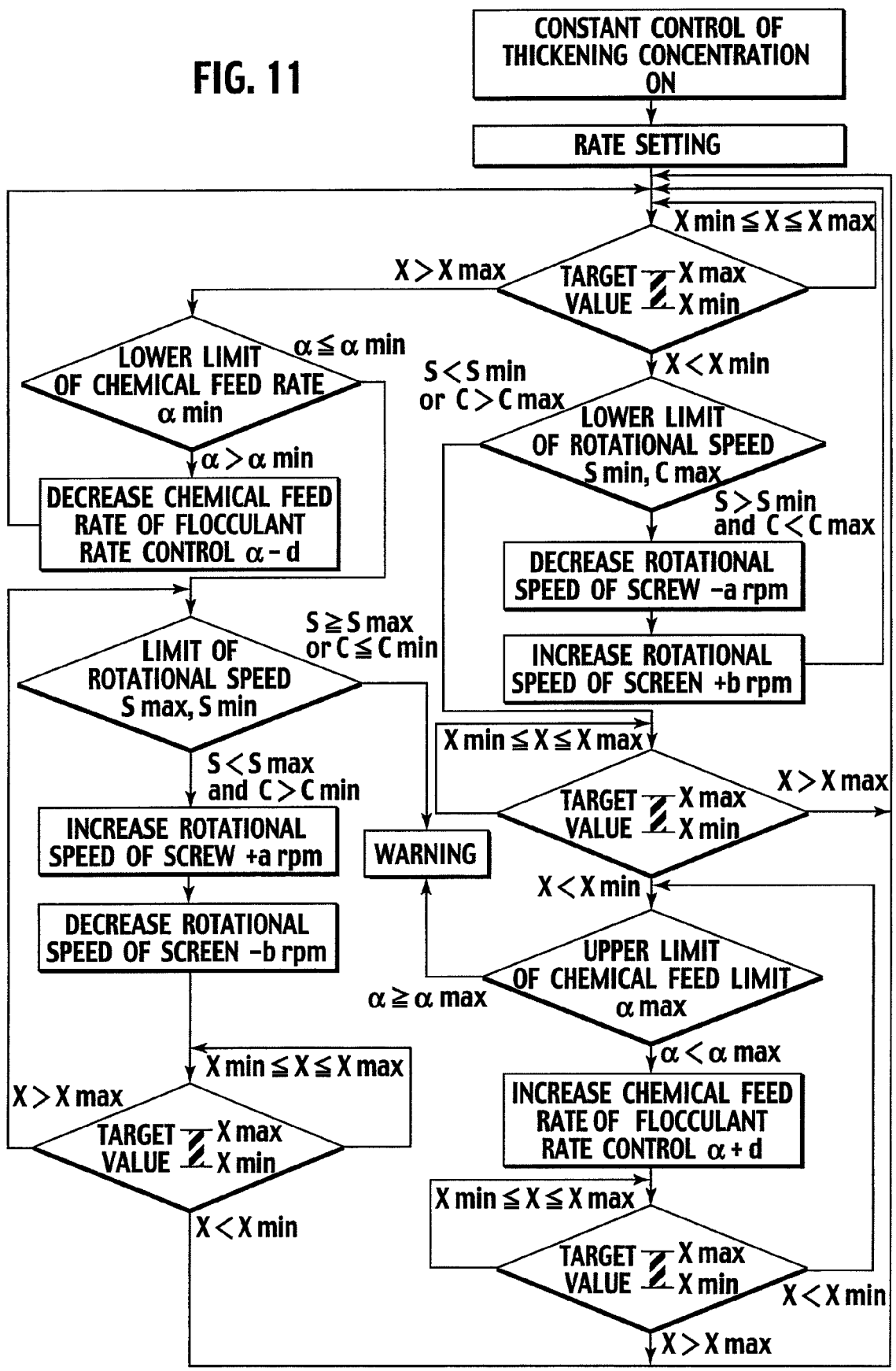
FIG. 11 is a flowchart showing a control method of a sludge thickener when a thickened sludge concentration X is out of a setting range, when adopting a method in which a screw and an outer cylinder rotate simultaneously.

In addition, as shown in the flowchart of FIG. 11, in the above described step [1]-(e), the rotational speed C of the outer cylinder screen 21 may also be increased/decreased along with the rotational speed S of the screw 39. To be more precise, an instruction signal for simultaneously rotating the screw 39 and the outer cylinder screen 21 is sent from the discriminator 91 to the first controller 92. When the first controller 92 receives the above instruction signal, the first controller 92 simultaneously operates the screw driving machine 85 and the outer cylinder driving machine 86 so that the rotational speed S of the screw 39 is increased by an increment/decrement rotational speed a (a=1 to 2 min$^{-1}$), and the rotational speed C of the outer cylinder screen 21 is decreased by the increment/decrement rotational speed b (b=1 to 2 min$^{-1}$). This operation is repeatedly performed until the thickened sludge concentration X becomes less than or equal to the upper limit X max of the thickened sludge concentration %; until the rotational speed S of the screw 39 becomes equal to the upper limit S max of the rotational speed; or until the rotational speed C of the outer cylinder screen 21 becomes equal to the lower limit C min of the rotational speed.

According to this method, response rates of the screw 39 and the outer cylinder screen 21 in response to the thickened sludge concentration X can be increased.

Moreover, when a summation (a+(−b)=0) of an increment/decrement rotational speed a of the screw 39 and an increment/decrement rotational speed b of the outer cylinder screen 21 to be increased/decreased stepwise at a time is set to be fixed, control is simplified.

[2] When the thickened sludge concentration X is decreased below the lower limit X min of the thickened sludge concentration %

FIG. 10 is a flowchart of a method of maintaining a thickened sludge concentration X in a sludge thickener to be constant. Referring to FIG. 10, a procedure of (a) to (g) is described.

(a) When the thickened sludge concentration X is decreased below a lower limit X min of the thickened sludge concentration, an instruction signal for decreasing the rotational speed S of the screw 39 is sent from the discriminator 91 to the first controller 92.

(b) The first controller 92 operates the screw driving machine 85 to decrease the rotational speed S of the screw 39 by an increment/decrement rotational speed a (a=1 to 2 min$^{-1}$). This operation is repeatedly performed until the thickened sludge concentration X becomes not less than or equal to the lower limit X min of the thickened sludge concentration, or until the rotational speed S of the screw 39 becomes equal to the lower limit S min to decrease the rotational speed S of the screw 39 stepwise.

(c) When the rotational speed S of the screw 39 becomes equal to the lower limit S min, if the thickened sludge concentration X is lower than the upper limit of thickened sludge concentration X min, an instruction signal for increasing the rotational speed C of the outer cylinder screen 21 is sent from the discriminator 91 to the first controller 92, while retaining the lower limit S min of the rotational speed.

(d) The first controller 92 operates the outer cylinder driving machine 86 to thereby increase the rotational speed C of the outer cylinder screen 21 by an increment/decrement rotational speed b (b=1 to 2 min$^{-1}$). This operation is repeatedly performed until the thickened sludge concentration X becomes greater than or equal to the lower limit X min of the thickened sludge concentration, or until the rotational speed C of the outer cylinder screen 21 becomes equal to the upper limit C max of the rotational speed.

(e) When the thickened sludge concentration X is lower than the lower limit X min of the thickened sludge concentration and when the rotational speed C of the outer cylinder screen 21 becomes equal to the upper limit C max of the rotational speed, information that the rotational speed C of the outer cylinder screen 21 becomes equal to the upper limit C max of the rotational speed is sent from the discriminator 91 to the ratio setter 93, and an instruction signal for increasing the chemical feed rate α of flocculant is sent from the ratio setter 93 to the second controller 94.

(f) The second controller 94 controls the flocculant-feeding pump 97 to thereby increase the chemical feed rate α of flocculent by a chemical feed rate d (d=0.01 to 0.03%). This operation is repeatedly performed stepwise until the thickened sludge concentration X becomes greater than or equal to the lower limit X min of the thickened sludge concentration, or until the chemical feed rate α of flocculant becomes equal to the upper limit α max of chemical feed rate % □

(g) When the chemical feed rate α of flocculent becomes equal to the upper limit α max of chemical feed rate %, an abnormality warning is sent out and a program is modified, while retaining a state in the upper limit α max of chemical feed rate %.

According to the above method, an order of priority is determined for the three operational factors of the chemical feed rate α of flocculant, the rotational speed S of the screw 39, and the rotational speed C of the pouter cylinder screen 21 to be thereafter varied stepwise, in response to the fluctuations of the thickened sludge concentration X, whereby the thickened sludge concentration X can be maintained to be constant, and an amount of chemicals can be reduced in response to the variation of sludge property. Moreover, since the sludge concentration of thickened sludge becomes stable, a management of process operation after thickening is facilitated.

Second Modified Example of First Embodiment

Moreover, as shown in the flowchart of FIG. 11, in the above described step [2]-(a), the rotational speed C of the outer cylinder screen 21 may also be increased/decreased along with the rotational speed S of the screw 39. To be more precise, an instruction signal for simultaneously rotating the screw 39 and the outer cylinder screen 21 is sent from the discriminator 91 to the first controller 92. The first controller 92, which has received the above instruction signal, simultaneously operates the screw driving machine 85 and the outer cylinder driving machine 86 so that the rotational speed S of the screw 39 is decreased by an increment/decrement rotational speed a (a=1 to 2 min$^{-1}$), and the rotational speed C of the outer cylinder screen 21 is increased by an increment/decrement rotational speed b (b=1 to 2 min$^{-1}$). This operation is repeatedly performed until the thickened sludge concentration X becomes greater than or equal to the lower limit X min of the thickened sludge concentration; until the rotational speed S of the screw 39 becomes equal to the lower limit S min of the rotational speed; or until the rotational speed C of the outer cylinder screen 21 becomes equal to the upper limit C max of the rotational speed. When the rotational speed S of the screw 39 has become equal to the lower limit S min of the rotational speed, or the rotational speed C of the outer cylinder screen 21 has become equal to the upper limit C max of the rotational speed, the above information is sent from the discriminator 91 to the ratio setter 93, and an instruction signal for increasing the chemical feed rate α of flocculant is sent from the ratio setter 93 to the second controller 94.

According to this method, response rates of the screw 39 and the outer cylinder screen 21 in response to the thickened sludge concentration X can be increased.

Moreover, when a summation (a+(−b)=0) of an increment/decrement rotational speed a of the screw 39 and an increment/decrement rotational speed b of the outer cylinder screen 21 to be increased/decreased stepwise at a time is set to be fixed, control is simplified.

[3] When the thickened sludge concentration X is not less than the lower limit X min of the thickened sludge concentration % and not greater than the upper limit X max of the thickened sludge concentration %

When an amount of raw slurry Qs fluctuates, the following sludge thickening method may be adopted.

First, rotational speeds of the screw 39 and the outer cylinder screen 21 to be adopted for sludge thickening are described.

By using sewage sludge having a raw slurry concentration of 0.6% for the differential rate rotary thickener 80, optimal rotational speeds Sso, Cso of the screw 39 and the outer cylinder screen 21, respectively, which rotate in directions opposite to each other at different speeds from each other were calculated. Set values of the optimal rotational speeds Sso, Cso in response to an amount of raw slurry Qs are empirically found out, and one half of an amount of feed raw slurry sludge is appropriate for a conveying speed by the rotation of the screw 39. There is a problem for the rotational speed C of the outer cylinder screen 21 with respect to how often a fresh filtration surface is recovered, and the same idea as that used for the number of times of cleaning in response to the amount of raw slurry Qs was applied. For a process of 10 m³/m²/h, cleaning needs the speed of 15 rpm, and the rotational speed C of the outer cylinder screen 21 was also set to be increased in multiples of 15 in proportion to the amount of process. The optimal rotational speeds Sso, Cso of the screw 39 and the outer cylinder screen 21, respectively, for the amount of process raw slurry are shown in Table 4.

S1 and C1 are set depending on the property of raw slurry sludge. Additionally, standard relational expressions of the optimal rotational speed Sso of the screw 39 and the optimal rotational speed Cso of the outer cylinder screen 21 in response to the amount of feed raw slurry Qs are stored in the discriminator 91 in advance along with the rotational factors S1 and C1 obtained depending on the property of raw slurry sludge.

Next, a procedure for a sludge thickening method is described in (a) to (c) as follows.

(a) Although an amount of feed raw slurry Qs is constant in a usual operation, when the amount of feed raw slurry Qs is changed for some reason while operating, the amount of feed raw slurry Qs is detected with the flowmeter 98 and a detection signal is sent to the discriminator 91.

(b) The discriminator 91 receives the detection signal, and the optimal rotational speed Sso of the screw 39 and the optimal rotational speed Cso of the outer cylinder screen 21 are calculated from the relational expressions to thereafter send an instruction signal to the first controller 92.

(c) The first controller 92 operates the screw driving machine 85 and the outer cylinder driving machine 86 to vary the rotational speed S of the screw 39 and the rotational speed C of the outer cylinder screen 21 to the optimal rotational speeds Sso, Cso, respectively.

TABLE 4

| AMOUNT OF PROCESS RAW SLURRY | OPTIMAL ROTATIONAL SPEED OF SCREW | OPTIMAL ROTATIONAL SPEED OF OUTER SYLINDER SCREEN | THICKENING MULTIPLYING FACTOR |
|---|---|---|---|
| 10 m³/m²/h | 5 rpm | −15 rpm | 8-10 TIMES |
| 15 m³/m²/h | 7.5 rpm | −22 rpm | 6-8 TIMES |
| 22 m³/m²/h | 10 rpm | −30 rpm | 5-6 TIMES |

Table 4 shows an operational example in which excess sewage sludge having a raw slurry concentration of 0.6% is thickened by a differential rate thickener having the outer cylinder screen 21 with an inner diameter F of 300 mm.

Relational expressions of the optimal rotational speeds Sso and Cso of the screw 39 and the outer cylinder screen 21, respectively, for each amount of feed sludge obtained from Table 4 are given as follows.

Optimal rotational speed $Sso$ (rpm) of screw 39=0.5×Process speed of raw slurry (m³/m²/h)

Optimal rotational speed $Cso$ (rpm) of outer cylinder screen 21=1.5×Process speed for raw slurry (m³/m²/h)

Accordingly, standard calculation expressions are as follows.

Optimal rotational speed $Sso$ (rpm) of screw 39=Rotational factor $S1$×Process speed for raw slurry (m³/m²/h)

Optimal rotational speed $Cso$ (rpm) of outer cylinder screen 21=Rotational factor $C1$×Process speed for raw slurry (m³/m²/h)

Accordingly, based on the above data analysis, once the rotational factors S1 and C1 are determined, a program can be easily written. For sewage sludge having a raw slurry concentration of 0.6%, S1=0.5 and C1=1.5 are preferable. However, for sludge having poor filtration characteristics and poor thickening property, or in a differential rate rotary thickener 80 of large size, values of S1 and C1 are smaller than the above. As described above, the values of the rotational factors According to the above method, even if an amount of feed raw slurry Qs fluctuates, since the screw 39 and the outer cylinder screen 21 are respectively rotated at optimal rotational speeds for thickening the feed raw slurry Qs, sludge thickening can be operated at high thickening efficiency.

[4] At a time when starting to operate a sludge thickener

The following sludge thickening method may be adopted.

At a time when starting to operate a sludge thickener, the screw 39 and the outer cylinder screen 21 are rotated at an optimal rotational speed Sso of the screw 39 and an optimal rotational speed Cso of the outer cylinder screen 21, respectively, as described in [3] above.

According to the above method, since the sludge thickener can start to be operated from the state with high thickening efficiency, the rotational speed S of the screw 39 and the rotational speed C of the outer cylinder screen 21 need not be set on an individual case-by-case basis in response to the property of raw slurry when starting the operation.

Second Embodiment

Although a sludge thickener of a second embodiment has the same constitution as that of the first embodiment shown in FIG. 1, a control program to be installed in the discriminator 91 is different. When the control program is different, a sludge thickening method is also different. Since the other constitution and operation are the same as those in the first embodiment, descriptions of the same parts are omitted. Throughout the drawings, the same reference numerals and symbols are given to corresponding components.

A control program to be installed in the discriminator 91 is described.

Sequential electrical signals of 4 to 20 mA outputted from the power detector 87 are to be sent to the discriminator 91. A sliding resistance of the detecting body 90 to desired thickened sludge, which has been thickened by the differential rate rotary thickener 80, is calculated in advance as a stable current value of the driving motor 89 to set the rates of upper and lower limits in an allowable range. The stable current value and the rates of upper and lower limits are inputted in advance in the discriminator 91.

Next, a procedure for a sludge thickening method is described in (a) to (g) as follows.

(a) Based on sequential electrical signals to be inputted from the power detector 87 to the discriminator 91, mean electrical value is calculated for every given period of time.

(b) Further arithmetic on the mean values are repeatedly performed several times to obtain a mean value thereof; and a comparison operation is performed on the mean electrical value thus obtained, and the rate of an upper limit and the rate of a lower limit for a stable current value during operation which has been set in advance.

(c) if the mean electrical value is continuously lower than the rate of the lower limit of the stable electrical value, the rotational speed S of the screw 39 is decreased by the predetermined amount of rotational speed.

(d) The above operation is repeatedly performed, and when the mean electrical value falls within the allowable range for the stable electrical value, the rotational speed of the screw 39 is maintained.

(e) Additionally, if the mean electrical value is continuously increased above the rate of the upper limit for the stable electrical value, the rotational speed S of the screw 39 is increased by a predetermined amount of rotational speed.

(f) The above operation is repeatedly performed, and when the mean electrical value falls within the allowable range for the stable electrical value, the rotational speed of the screw 39 is maintained.

(g) When the successive mean electrical values detected are out of the range of the rates of upper and lower limits for the stable current value even if the rotational speed S of the screw 39 is controlled, an instruction signal is sent from the discriminator 91 to the flocculant-feeding pump 97. When the mean electrical values are lower than the rate of the lower limit for the stable electrical value, the chemical feed rate α of flocculant is increased; and when the mean electrical value becomes higher than the rate of an upper limit for a stable electrical value, the chemical feed rate α of flocculant is decreased, so that the chemical feed rate α of flocculant is automatically adjusted in response to the fluctuation of sludge property.

As described above, in the sludge thickener and the sludge thickening method of the second embodiment, with the amount of feed raw slurry Qs maintained to be constant, a rotational control of the screw 39 is performed as describe above. However, when the amount of feed raw slurry Qs fluctuates, if the rotational speed C of the screw 39 and the outer cylinder screen 21, respectively, as initial settings are increased/decreased in proportion to the amount of feed raw slurry Qs, an optimal operation is achieved. When the property of sludge is varied to a large extent and the amount of feed raw slurry Qs also needs to be varied, the rotational speed C of the outer cylinder screen 21 may be varied in proportion to the amount of feed raw slurry Qs to thereby control the rotational speed. The reason why the rotational speed of the screw 39 is first controlled is that response in the sludge concentration to be thickened is directly appeared. This is because chemical feed rate needs time for a reaction between sludge and flocculent and thus time is required for an appropriate response. According to this procedure, chemical feed rate can be reduced and thus a minimum flocculant addition becomes possible.

Hereinafter, a more precise description is given.

Figure 16:
FIG. 16 is a graph showing a relationship between rotational speed of a screw and thickened sludge concentrations.

FIG. 16 shows a relationship between the rotational speed S of the screw 39 and thickened sludge concentration, with the rotational speed S (rpm) of the screw 39 on the horizontal axis and with thickened sludge concentration % on the vertical axis. An operational condition for the differential rate rotary thickener 80 is that a predetermined amount of sludge is processed while maintaining the rotational speed C of the outer cylinder screen 21 to be constant. In this example, if the rotational speed S of the screw 39 is increased to 5, 10 and 15 rpm, the thickened sludge concentration is approximately 4.7, 4.0 and 3.5%, respectively. That is, an influence of rotation of the screw 39 on sludge concentration is that, when the rotational speed S is increased, a retaining period of sludge inside the outer cylinder screen 21 becomes shorter and thickened sludge concentration is decreased. On the other hand, when the rotational speed S of the screw 39 is decreased, a retaining period of sludge inside the outer cylinder screen 21 becomes longer, which expresses that thickened sludge concentration is increased.

Figure 17:
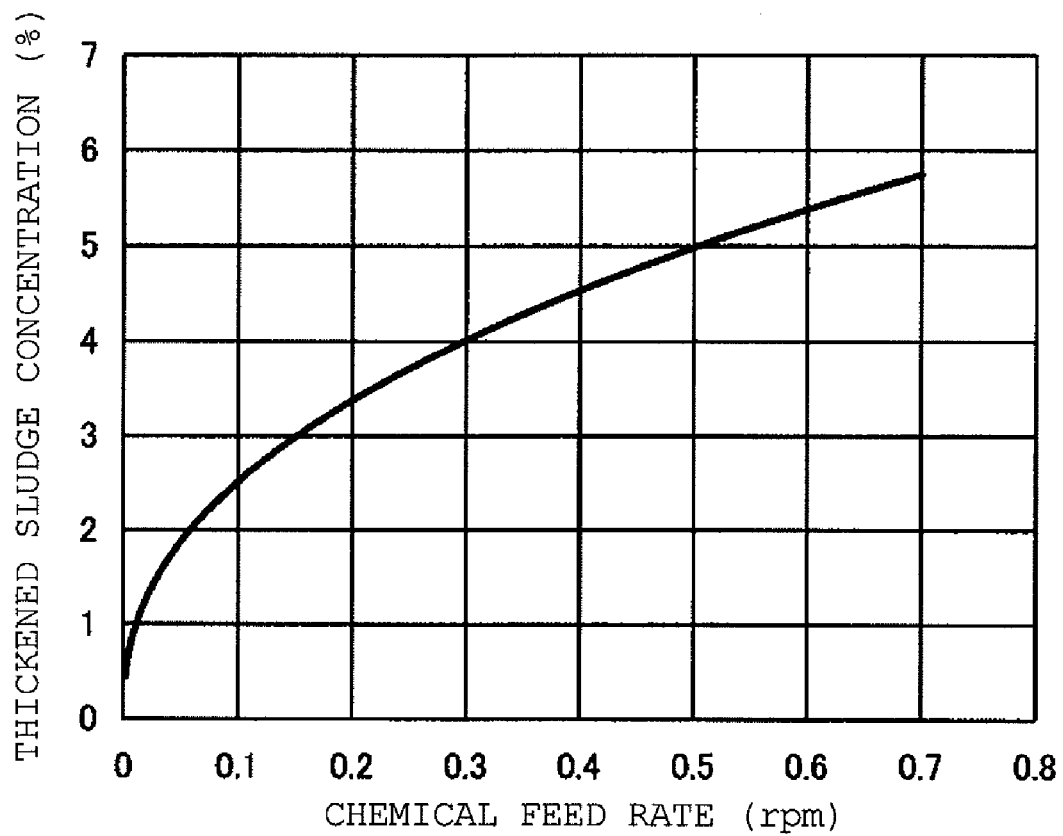
FIG. 17 is a graphing showing a relationship between chemical feed rates and thickened sludge concentrations.

FIG. 17 shows a relationship between chemical feed rate α and thickened sludge concentration X, with chemical feed rate α on the horizontal axis and with thickened sludge concentration X on the vertical axis. An operational condition for the differential rate rotary thickener 80 is that a predetermined amount of sludge is processed while maintaining the rotational speed C of the outer cylinder screen 21 to be constant. In this example, when the chemical feed rate for sludge is increased to 0.2, 0.3 and 0.4, the thickened sludge concentration X is approximately 2, 4 and 5%, respectively. An influence of change of the chemical feed rate on sludge concentration is that, when the chemical feed rate is increased, the thickened sludge concentration is also increased. On the other hand, when the chemical feed rate is decreased, the thickened sludge concentration is also decreased. In this example, if a standard sludge concentration, which gives a stable electrical value, is 4%, a standard chemical feed rate is set to 0.3%. In addition, the chemical feed rate α of flocculant is increased/decreased by 0.01% at a time.

Figure 12:
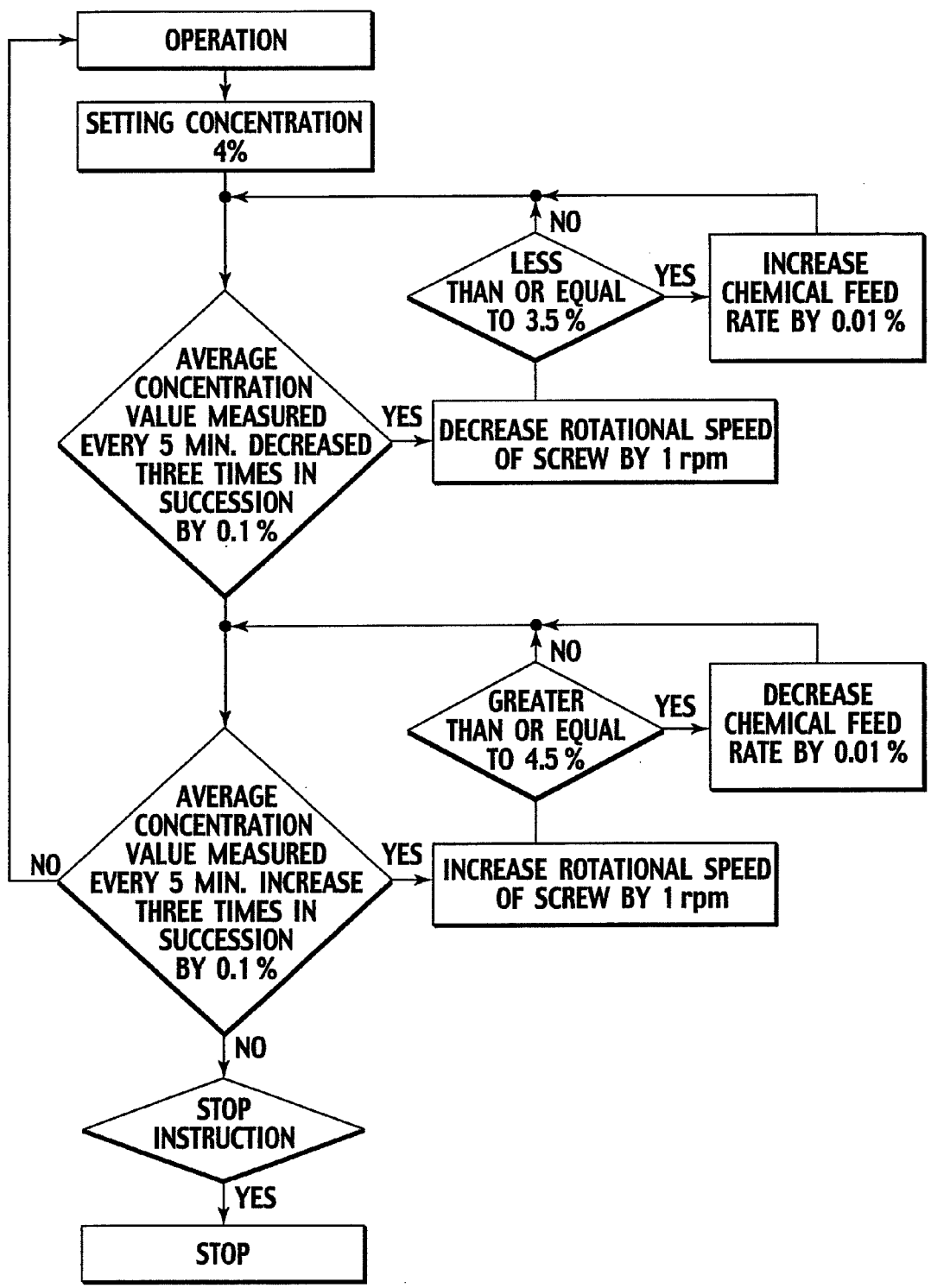
FIG. 12 is a flowchart showing a control method of a differential rate rotary thickener.

FIG. 12 is a flowchart of a control method of the differential rate rotary thickener 80. A comparison operation is performed on a mean electrical value sent from the power detector 87 to the discriminator 91, and a stable electrical value already set. Thereafter, arithmetic are performed to figure out whether or not mean concentration values measured every five minutes are successively decreased for the predetermined number of times (about 3 times). When the thickened sludge concentration X is 0.1% or more lower than the standard sludge concentration of 4%, the rotational speed S of the screw 39 is decreased from 10 rpm by 1 rpm. The property of sludge constantly changing is sometimes recovered by itself, and sequential electrical signals from the power detector 87 are measured every 5 minutes. Measured again after 5 minutes, if the thickened sludge concentration is still 0.1% or more lower than the standard sludge concentration of 4%, the rotational speed S of the screw 39 is further decreased by 1 rpm. This operation is repeated several times until the concentration becomes 3.5% or less. When an operation of the rotational speed S of the screw 39 causes the concentration to be 3.5% or less, the chemical feed rate is increased from 0.3% to 0.31% and the signal is measured again after 5 minutes. This operation is repeated, and when the measured mean sludge concentration falls within an allowable range, the rotational speed S of the screw 39 of the differential rate rotary thickener 80 is maintained.

Arithmetic performed to figure out whether or not mean concentration values measured every five minutes are successively decreased for the predetermined number of times in the discriminator 91. When the thickened sludge concentration is 0.1% or more higher than the standard sludge concentration of 4%, the rotational speed S of the screw 39 is increased from 10 rpm by 1 rpm, and measurement is again made after 5 minutes. If the concentration is still 0.1% or more higher than the standard sludge concentration of 4%, the rotational speed S of the screw is further increased by 1 rpm, and the operation is repeatedly performed several times until the concentration becomes 4.5% or less. When the concentration is not decreased to 4.5% or less even if the rotational speed S of the screw 39 is controlled, the chemical feed rate is decreased from 0.3% to 0.29%, and measurement is again made after 5 minutes. This operation is repeatedly performed, and when the measured mean sludge concentration falls within the allowable range, the rotational speed S of the screw 39 of the differential rate rotary thickener 80 is maintained.

Note that, in this example, a current value, which was measured by the power detector 87 when the standard sludge concentration was set to 4% and the standard rotational speed of the screw 39 was set to 10 rpm, was set as the stable current value. Measurements were made every 5 minutes in response to the fluctuations of the thickened sludge concentration X; an increment/decrement of the rotational speed S of the screw 39 was set at 1 rpm; and an increment/decrement rate of the chemical feed rate $\alpha$ of flocculant was set at 0.01%. The values of the rotational speed S of the screw 39 and the chemical feed rate $\alpha$ of flocculant can be arbitrarily set depending on the property of sludge, an amount of feed sledge, and the rotational speed C of the outer cylinder screen 21.

INDUSTRIAL APPLICABILITY

According to the sludge thickener and the sludge thickening method of the present invention, the concentration of thickened sludge discharged from the differential rate rotary thickener 80 is measured, and, depending on the concentration of the thickened sludge, the rate of addition of flocculent, and the rotational speed S of the screw 39 and the rotational speed C of the outer cylinder screen 21, respectively, rotating in directions opposite to each other are controlled stepwise to thereby prevent excessive loads from being applied on the screw 39 and the outer cylinder screen 21, so that sludge concentration after thickening can be maintained to be constant. The concentration of thickened sludge discharged from the differential rate rotary thickener 80 is measured, and, depending on the concentration of the thickened sludge, the rate of addition of flocculent, and the rotational speed S of the screw 39 and the rotational speed C of the outer cylinder screen 21, respectively, rotating in directions opposite to each other are controlled stepwise with an order of priority so that an amount of used chemicals of flocculent can be controlled to ensure minimum and sludge concentration after thickening can be maintained to be constant. Since the sludge concentration after thickening is stable, a management of process operation after thickening becomes simple.

When an amount of feed raw slurry sludge varies, the most appropriate rotational speed S of the screw 39 and the rotational speed C of the outer cylinder screen 21 in response to the amount of raw slurry Qs thus fed are set to thereafter control the differential rate rotary thickener 80, an operation with an effective thickening can be performed even if the amount of feed raw slurry sludge Qs varies.

Furthermore, according to the sludge thickener and the sludge thickening method of the present invention, since the outer diameter f of the cylindrical center axle 41 of the screw 39 in the differential rate rotary thickener 80 is set to 40% to 65% of the inner diameter F of the outer cylinder screen 21, sludge thickening can be performed at high thickening efficiency. In addition, as the number of the screw vane 43, one of a single-, a double-, a triple-thread types is set to be depending on the property of raw slurry of sludge, a target thickening concentration, and the like, sludge thickening can be performed at high thickening efficiency. Accordingly, since sludge thickening can be efficiently operated, a process requiring high thickened sludge concentration can be dealt with.

Moreover, according to the sludge thickener and the sludge thickening method of the present invention, the detecting body 90 of the concentration detector which is disposed in sludge after thickening is formed in cylindrical shape, which is hardly influenced by fluctuation of flow. Therefore, little data dispersion is generated in sludge concentrations after thickening even for sludge having poor filtration characteristics such as excess activated sludge or the like in addition to sewage mixed sludge or sewage primary sludge having comparatively favorable filtration characteristics. Based on such sludge concentration data after thickening, the rotational speed S of the screw 39 and the rotational speed C of the outer cylinder screen 21 in the differential rate rotary thickener 80, and the rate of addition of flocculent are controlled so that fluctuation in sludge concentration after thickening is small in the sludge thickener and the sludge thickening method. Accordingly, since the sludge concentration after thickening is stable, a management of process operation after thickening is facilitated. A rotary thickener can be achieved, which is adaptable for process of sludge such as excess activated sludge or the like having poor filtration characteristics in addition to sewage mixed sludge or sewage primary sludge having comparatively favorable filtration characteristics.

The invention claimed is:

1. A sludge thickening device comprising:
   a differential rate rotary thickener, provided with a screw in a rotatable outer cylinder screen, for filtering raw slurry sludge being fed to a feed end of the outer cylinder screen, and for discharging thickened sludge from a discharge end of the outer cylinder screen, while rotating the screw at a variable speed;
   a thickened-sludge-concentration detecting section configured to detect a sludge concentration of the thickened sludge discharged from the differential rate rotary thickener;
   a flocculant-feeding section provided with a flocculant-feeding pump for feeding flocculant to the raw slurry sludge; and
   a control section configured to control a rotational speed C of the outer cylinder screen, a rotational speed S of the screw, and an amount of the flocculant to be fed by the flocculant-feeding pump;
   wherein:
   the differential rate rotary thickener includes an outer cylinder driving machine configured to rotate the outer cylinder screen, and a screw driving machine configured to rotate the screw;
   the thickened-sludge-concentration detecting section includes a sludge receiver tank configured to store the thickened sludge discharged from the differential rate rotary thickener, and a power detector configured to detect the sludge concentration of the thickened sludge and to send an electric signal to the control section; and the control section includes:
- a discriminator configured to receive the electric signal sent from the thickened-sludge-concentration detecting section, and thus perform arithmetic on, and discriminate, the electric signal data,
- a first controller configured to receive a first instruction signal sent from the discriminator for controlling rotational speeds respectively of the outer cylinder driving machine and the screw driving machine,
- a ratio setter configured to receive the first instruction signal sent from the discriminator for varying a chemical feed rate α of the flocculant fed to the raw slurry sludge stepwise, and
- a second controller configured to receive a second instruction signal sent from the ratio setter for operating the flocculant-feeding pump.

2. The sludge thickening device according to claim 1, wherein:
- the outer cylinder screen is closed at both ends with discoidal flange plates;
- the screw includes a cylindrical center axle provided with a screw vane on an outer peripheral surface thereof;
- a diameter f of the cylindrical center axle is 40% to 70% of an inner diameter F of the outer cylinder screen;
- an inlet opening configured to lead the raw slurry sludge into the outer cylinder screen from an inside of a cylindrical hollow part of the cylindrical center axle is provided on a part of a peripheral surface of the cylindrical center axle, the part being positioned near one end of the outer cylinder screen; and
- an outlet opening configured to discharge the thickened sludge is provided on the flange plate near the other end of the outer cylinder screen.

3. The sludge thickening device according to claim 2, wherein the screw vane is one of a single-thread vane, a double-thread vane, a triple-thread vane.

4. The sludge thickening device according to claim 1, wherein:
- the discriminator stores an upper limit X max and a lower limit X min of the thickened sludge concentration, an upper limit C max and a lower limit C min of rotational speed of the outer cylinder screen, and an upper limit S max and a lower limit S min of rotational speed of the screw, which are set in advance; and the discriminator sends the first instruction signal when the thickened sludge concentration X, which is detected by the thickened-sludge-concentration detecting section, is not less than the upper limit X max of the thickened sludge concentration or not greater than the lower limit X min of the thickened sludge concentration;
- the first controller receives the first instruction signal sent from the discriminator; and when the thickened sludge concentration X, which is detected by the thickened-sludge-concentration detecting section, is not less than the upper limit X max of the thickened sludge concentration, the first controller increases a rotational speed of the screw driving machine stepwise when a chemical feed rate of flocculant is not greater than a lower limit α min of the chemical feed rate; and when the thickened sludge concentration X, which is detected by the thickened-sludge-concentration detecting section, is not greater than the lower limit X min of the thickened sludge concentration X min, the first controller decreases the rotational speed of the screw driving machine stepwise until the thickened sludge concentration X becomes not less than the lower limit X min of the thickened sludge concentration or until a rotational speed S of the screw becomes equal to the lower limit S min of the rotational speed;
- the ratio setter stores the chemical feed rate α of flocculant, and an upper limit α max and a lower limit α min, which are respectively a maximum value and a minimum value of the chemical feed rate α of flocculant, and which are all set in advance; and the ratio setter receives the first instruction signal sent from the discriminator; and when the thickened sludge concentration X, which is detected by the thickened-sludge-concentration detecting section, is not less than the upper limit X max of the thickened sludge concentration, the ratio setter sends a second instruction signal until the thickened sludge concentration X becomes not greater than the upper limit X max of the thickened sludge concentration X max or until the chemical feed rate of flocculant becomes equal to the lower limit α min of the chemical feed rate; and when the thickened sludge concentration X, which is detected by the thickened-sludge-concentration detecting section, is not greater than the lower limit X min of the thickened sludge concentration, the ratio setter sends the second instruction signal when the rotational speed S of the screw is not greater than the lower limit S min of the rotational speed; and
- the second controller receives the second instruction signal sent from the ratio setter; and when the thickened sludge concentration X, which is detected by the thickened-sludge-concentration detecting section, is not less than the upper limit X max of the thickened sludge concentration, the second controller decreases the chemical feed rate α of flocculant stepwise until the thickened sludge concentration X becomes not greater than the upper limit X max of the thickened sludge concentration or until the chemical feed rate of flocculant becomes equal to the lower limit α min of the chemical feed rate; and when the thickened sludge concentration X, which is detected by the thickened-sludge-concentration detecting section, is not greater than the lower limit X min of thickened sludge concentration, increases the chemical feed rate α of flocculant stepwise when the rotational speed S of the screw is not greater than the lower limit S min of rotational speed.

5. The sludge thickening device according to claim 1, wherein:
- the discriminator stores an upper limit X max, a lower limit X min of the thickened sludge concentration, an upper limit C max and a lower limit C min of rotational speed of the outer cylinder screen, and an upper limit and a lower limit S min of the rotational speed of the screw, which are set in advance; and the discriminator sends the first instruction signal when the thickened sludge concentration X, which is detected by the thickened-sludge-concentration detecting section, is not less than the upper limit X max of the thickened sludge concentration or not greater than the lower limit X min of the thickened sludge concentration;
- the first controller receives the first instruction signal sent from the discriminator; and
- when the thickened sludge concentration X, which is detected by the thickened-sludge-concentration detecting section, is not less than the upper limit X max of the thickened sludge concentration, the first controller increases the rotational speed of the screw driving machine stepwise until the rotational speed S of the screw becomes equal to the maximum rotational speed S max when the chemical feed rate of flocculant is not greater than the lower limit α min of the chemical feed rate; and when the rotational speed S of the screw is not less than the upper limit S max of the rotational speed, the first controller decreases the rotational speed of the outer cylinder driving machine stepwise until the thickened sludge concentration X becomes not greater than the upper limit X max of the thickened sludge concentration; and when the thickened sludge concentration X, which is detected by the thickened-sludge-concentration detecting section, is not greater than the lower limit X min of the thickened sludge concentration, the first controller decreases the rotational speed of the screw driving machine stepwise until the thickened sludge concentration X becomes not less than the lower limit X min of the thickened sludge concentration or until the rotational speed S of the screw becomes equal to the lower limit S min of the rotational speed; and when the rotational speed of the screw is not greater than the lower limit S min of the rotational speed, the first controller increases the rotational speed of the outer cylinder driving machine stepwise until the sludge concentration becomes not less than the lower limit X min of the thickened sludge concentration or until the rotational speed of the outer cylinder screen becomes equal to the upper rotational speed C max;

the ratio setter stores the chemical feed rate α of flocculant, and an upper limit α max and a lower limit α min of the chemical feed rate of flocculant, which are respectively a maximum value and a minimum value of the chemical feed rate α of flocculant, and which are all set in advance; the ratio setter receives the first instruction signal sent from the discriminator; and when the thickened sludge concentration X, which is detected by the thickened-sludge-concentration detecting section, is not less than the upper limit X max of thickened sludge concentration, the ratio setter sends a second instruction signal until the thickened sludge concentration X becomes not greater than the upper limit X max of the thickened sludge concentration or until the chemical feed rate of flocculant becomes equal to the lower limit α min of the chemical feed rate; and when the thickened sludge concentration X, which is detected by the thickened-sludge-concentration detecting section, is not greater than the lower limit X min of the thickened sludge concentration, the ratio setter sends the second instruction signal when the rotational speed C of the outer cylinder screen is not less than the upper limit C max of the rotational speed; and the second controller receives the second instruction signal sent from the ratio setter; and when the thickened sludge concentration X, which is detected by the thickened-sludge-concentration detecting section, is not less than the upper limit X max of the thickened sludge concentration, the second controller decreases the chemical feed rate α of flocculant stepwise until the thickened sludge concentration X becomes not greater than the upper limit X max of the thickened sludge concentration or until the chemical feed rate of flocculant becomes equal to the lower limit α min of the chemical feed rate; and when the thickened sludge concentration X, which is detected by the thickened-sludge-concentration detecting section, is not greater than the lower limit X min of the thickened sludge concentration, the second controller increases the chemical feed rate α of flocculant stepwise when the rotational speed C of the outer cylinder screen is not less than the upper limit C max of the rotational speed.

6. The sludge thickening device according to claim 1, wherein:

the discriminator stores an upper limit X max and a lower limit X min of the thickened sludge concentration, an upper limit C max of and a lower limit C min of the rotational speed of the outer cylinder screen, an upper limit S max and a lower limit S min of the rotational speed of the screw, which are set in advance; and the discriminator sends the first instruction signal in any one of the case where the thickened sludge concentration X, which is detected by the thickened-sludge-concentration detecting section, is not less than the upper limit X max of the thickened sludge concentration and the case where the thickened sludge concentration X is not greater than the lower limit X min of the thickened sludge concentration;

the first controller receives the first instruction signal sent from the discriminator; and when the thickened sludge concentration X, which is detected by the thickened-sludge-concentration detecting section, is not less than the upper limit X max of the thickened sludge concentration, the first controller increases a rotational speed of the screw driving machine stepwise, and simultaneously decreases the rotational speed of the outer cylinder driving machine stepwise, when the chemical feed rate of flocculant is not greater than a lower limit α min of the chemical feed rate; and when the thickened sludge concentration X, which is detected by the thickened-sludge-concentration detecting section, is not greater than the lower limit X min of the thickened sludge concentration, the first controller decreases the rotational speed of the screw driving machine stepwise, and simultaneously, increases the rotational speed of the outer cylinder driving machine stepwise until the thickened sludge concentration X becomes not less than the lower limit X min of the thickened sludge concentration, or until a rotational speed S of the screw becomes equal to the lower limit S min of the rotational speed, or until the rotational speed C of the outer cylinder screen becomes equal to the upper limit C max of the rotational speed;

the ratio setter stores the chemical feed rate α of flocculant, and an upper limit α max and a lower limit α min of the chemical feed rate of flocculant, which are respectively a maximum value and a minimum value of the chemical feed rate α of flocculant, and which are all set in advance; and the ratio setter receives the first instruction signal sent from the discriminator; and when the thickened sludge concentration X, which is detected by the thickened-sludge-concentration detecting section, is not less than the upper limit X max of the thickened sludge concentration, the ratio setter sends the second instruction signal until the thickened sludge concentration X becomes not greater than the upper limit X max of the thickened sludge concentration or until the chemical feed rate of flocculant becomes equal to the lower limit α min of the chemical feed rate; and when the thickened sludge concentration X, which is detected by the thickened-sludge-concentration detecting section, is not greater than the lower limit X min of the thickened sludge concentration, sends the second instruction signal when the rotational speed S of the screw is not greater than the lower limit of the rotational speed S min or when the rotational speed C of the outer cylinder screen is not less than the upper limit C max of rotational speed; and the second controller receives the second instruction signal sent from the ratio setter; and when the thickened sludge concentration X, which is detected by the thickened-sludge-concentration detecting section, is not less than the upper limit X max of the thickened sludge concentration, the second controller decreases the chemical feed rate α of flocculant stepwise until the thickened sludge concentration X becomes not greater than the upper limit X max of the thickened sludge concentration or until the chemical feed rate of flocculant becomes equal to the lower limit α min of the chemical feed rate; and when the thickened sludge concentration X, which is detected by the thickened-sludge-concentration detecting section, is not greater than the lower limit X min of the thickened sludge concentration, the second controller increases the chemical feed rate α of flocculant stepwise when the rotational speed S of the screw is not greater than the lower limit S min of the rotational speed, or when the rotational speed C of the outer cylinder screen is not less than the upper limit C max of the rotational speed of the outer cylinder screen.

7. The sludge thickening device according to claim 1, wherein:

the discriminator stores an upper limit X max and a lower limit X min of the thickened sludge concentration, an optimal rotational speed Cso of the outer cylinder screen, and an optimal rotational speed Sso of the screw, which are set in advance; and sends the first instruction signal at a time when starting to operate the differential rate rotary thickener and at a time when an amount of feed raw slurry Qs fluctuates when the thickened sludge concentration X, which is detected by the thickened-sludge-concentration detecting section, is lower than the upper limit X max of the thickened sludge concentration and higher than the lower limit X min of the thickened sludge concentration;

the optimal rotational speed Cso of the outer cylinder screen and the optimal rotational speed Sso of the screw are defined by the following relational expressions, which are derived by setting the rotational speeds of the screw and the outer cylinder screen depending on a fluctuating amount of feed raw slurry Qs:

Optimal rotational speed Sso (rpm) of screw=Rotational factor S1×Process speed of raw slurry (m³/m²/h); and Optimal rotational speed Cso (rpm) of outer cylinder screen=Rotational factor C1×Process speed of raw slurry (m³/m²/h);

the first controller receives the first instruction signal sent from the discriminator; and the first controller controls the screw driving machine and the outer cylinder driving machine based on the optimal rotational speeds Sso, Cso of the screw and the outer cylinder screen, respectively, calculated from the above relational expressions at a time when starting to operate the differential rate rotary thickener and at a time when the amount of feed raw slurry Qs fluctuates when a thickened sludge concentration X, which is detected by the thickened-sludge-concentration detecting section, is lower than the upper limit X max of the thickened sludge concentration and higher than the lower limit X min of the thickened sludge concentration.

8. The sludge thickening device according to claim 1, wherein the thickened-sludge-concentration detecting section further includes:

a cylindrical detecting body which is suspended down into the thickened sludge, a lower end thereof being open and an air hole being formed on a top end thereof; and a driving motor including a rotary axle being connected to the cylindrical detecting body;

the power detector detects a change in an electric current value of the driving motor and outputs the change in the electric current value in the form of the electric signal.

9. The sludge thickening device according to claim 2, wherein the differential rate rotary thickener further comprises:

an outer cylinder closed at both ends with the discoidal flange plates, a circumferential surface thereof being formed by the outer cylinder screen, wherein:

the outer cylinder has a degree-of-outlet-opening adjusting mechanism configured to increase/decrease an opening area of the outlet opening; and the degree-of-outlet-opening adjusting mechanism includes a shutter plate, the shutter plate being placed so as to overlap the flange plate having the outlet opening being formed thereon, the shutter plate providing a rotational displacement relative to the flange plate, the degree-of-outlet-opening adjusting mechanism configured to increase/decrease the opening area of the outlet opening with the shutter depending on a rotational position of the shutter relative to the flange plate.

10. A concentration detection device for a differential rate rotary thickener in which a screw is disposed in a rotatable outer cylinder screen; raw slurry sludge is fed into a feed end of the outer cylinder screen; filtered liquid is separated from the outer cylinder screen while rotating the screw at a variable speed; and thereafter thickened sludge is discharged from a discharge end of the outer cylinder screen, the concentration detection device comprising:

a cylindrical detecting body for detecting a sludge concentration of the thickened sludge, which is suspended down into the thickened sludge discharged from the differential rate rotary thickener, having a lower end thereof being open and on a top end thereof an air hole being formed;

a driving motor having a rotary axle which is connected to the cylindrical detecting body; and a power detector configured to detect a change in an electric current value of the driving motor, and output the change in the electric current value in the form of an electric signal.

11. The concentration detection device according to claim 10, wherein:

the power detector sends the electric signal to a discriminator configured to receive the electric signal, perform arithmetic on, and discriminate, the electric signal data.

12. The concentration detection device according to claim 11, wherein the discriminator receives successive electric signals sent from the power detector; calculates a mean current value of the successive electric signals; performs a comparison operation for the mean current value, and rates of upper and lower limits of a stable current value set in advance; decreases a rotational speed S of the screw when the mean current value becomes successively lower than the rate of the lower limit for the stable current value; and increases the rotational speed S of the screw when the mean current value becomes successively higher than the rate of the upper limit for the stable current value.

13. The concentration detection device according to claim 12, wherein:
the discriminator sends an instruction signal to a flocculant-feeding pump, even when the rotational speed S of the screw is controlled, if the mean current values having been continuously detected still increase to higher than the rate of an upper limit of the stable current value or still decrease to lower than the rate of an lower limit of the stable current value; the flocculant feeding pump receives the instruction signal sent from the discriminator; increases a chemical feed rate $\alpha$ of flocculant to be fed to raw slurry sludge when the mean current value is lower than the rate of the lower limit of the stable current value; and decreases the chemical feed rate $\alpha$ of flocculant to be fed to raw slurry sludge when the mean current value is higher than the rate of the upper limit of the stable current value.

* * * * *

UNITED STATES PATENT AND TRADEMARK OFFICE
CERTIFICATE OF CORRECTION

PATENT NO. : 7,828,961 B2
APPLICATION NO. : 11/911475
DATED : November 9, 2010
INVENTOR(S) : Sugaya et al.

It is certified that error appears in the above-identified patent and that said Letters Patent is hereby corrected as shown below:

Title page 2, Foreign Patent Documents, (column 2) of the printed patent, delete "JP2004-17014".

Signed and Sealed this
Sixteenth Day of August, 2011

David J. Kappos
*Director of the United States Patent and Trademark Office*